(12) United States Patent
Issakov et al.

(10) Patent No.: US 12,463,768 B2
(45) Date of Patent: Nov. 4, 2025

(54) RESOURCE-CONSTRAINED POSITION INFORMATION TRANSFER

(71) Applicant: QUALCOMM Incorporated, San Diego, CA (US)

(72) Inventors: Simon Issakov, Wayne, PA (US); Paul Boinske, Pottstown, PA (US); Geoffrey Cleary, Wilmington, NC (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 18/305,044

(22) Filed: Apr. 21, 2023

(65) Prior Publication Data
US 2024/0356697 A1    Oct. 24, 2024

(51) Int. Cl.
*H04L 5/00*    (2006.01)

(52) U.S. Cl.
CPC .................................. *H04L 5/0048* (2013.01)

(58) Field of Classification Search
CPC ...................................................... H04L 5/0048
See application file for complete search history.

(56) References Cited

U.S. PATENT DOCUMENTS

| | | | |
|---|---|---|---|
| 2014/0295825 A1* | 10/2014 | Chuang | H04L 1/02 455/425 |
| 2022/0334212 A1 | 10/2022 | Liu et al. | |
| 2022/0353843 A1 | 11/2022 | Bao et al. | |
| 2022/0373636 A1* | 11/2022 | Fischer | G01S 5/0063 |

OTHER PUBLICATIONS

International Search Report and Written Opinion—PCT/US2024/016831—ISA/EPO—Sep. 11, 2024.
Partial International Search Report—PCT/US2024/016831—ISA/EPO—Jun. 7, 2024.

* cited by examiner

*Primary Examiner* — Erika A Washington
(74) *Attorney, Agent, or Firm* — QUALCOMM Incorporated

(57) ABSTRACT

A method of providing UE location data includes: receiving, at the UE, reference signals each being from a respective one of a plurality of reference signal sources, and each being associated with a corresponding signal strength; obtaining, based on the reference signals, a first signal source data set comprising reference signal source identifiers and corresponding signal strengths for respective ones of the reference signals; producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and transmitting, from the UE, the second signal source data set.

26 Claims, 12 Drawing Sheets

RESOURCE-CONSTRAINED POSITION INFORMATION TRANSFER

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example method of providing user equipment (UE) location data includes: receiving, at the UE, a plurality of reference signals, each of the plurality of reference signals being from a respective one of a plurality of reference signal sources, and each of the plurality of reference signals being associated with a corresponding signal strength; obtaining, based on the plurality of reference signals, a first signal source data set comprising reference signal source identifiers and corresponding signal strengths for respective ones of the plurality of reference signals; producing a second signal source data set by compressing at least one of the reference signal source identifiers, or down-selecting available identifiers based on a signal strength diversity the corresponding signal strengths of the first signal source data set, each of the available identifiers comprising one of the reference signal source identifiers or a compressed one of the reference signal source identifiers; and transmitting, from the UE, the second signal source data set.

An example UE includes: one or more transceivers; one or more memories; and one or more processors, communicatively coupled to the one or more transceivers and the one or more memories, the one or more processors configured to: receive, via the one or more transceivers, a plurality of reference signals, each of the plurality of reference signals being from a respective one of a plurality of reference signal sources, and each of the plurality of reference signals being associated with a corresponding signal strength; obtain, based on the plurality of reference signals, a first signal source data set comprising reference signal source identifiers and corresponding signal strengths for respective ones of the plurality of reference signals; produce a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and transmit, via the one or more transceivers, the second signal source data set.

Another example UE includes: means for receiving, at the UE, a plurality of reference signals, each of the plurality of reference signals being from a respective one of a plurality of reference signal sources, and each of the plurality of reference signals being associated with a corresponding signal strength; means for obtaining, based on the plurality of reference signals, a first signal source data set comprising reference signal source identifiers and corresponding signal strengths for respective ones of the plurality of reference signals; means for producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and means for transmitting, from the UE, the second signal source data set.

An example non-transitory, processor-readable storage medium includes processor-readable instructions to cause one or more processors, of a UE, to: receive, at the UE, a plurality of reference signals, each of the plurality of reference signals being from a respective one of a plurality of reference signal sources, and each of the plurality of reference signals being associated with a corresponding signal strength; obtain, based on the plurality of reference signals, a first signal source data set comprising reference signal source identifiers and corresponding signal strengths for respective ones of the plurality of reference signals; produce a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and transmit, from the UE, the second signal source data set.

An example method of processing a signal source data set includes: receiving, at a network entity, the signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication; identifying, at the network entity, a first location of a first reference signal source based on the common identifying information and the first distinct identifying information; identifying, at the network entity, a second location of a second reference signal source based on the common identifying information and the second distinct identifying information; and determining, at the network entity, a range between a UE and the second reference signal source based on the signal strength indication, the first location of the first reference signal source, and the second location of the second reference signal source.

An example network entity includes: one or more transceivers; one or more memories; and one or more processors, communicatively coupled to the one or more transceivers and the one or more memories, the one or more processors configured to: receive, via the one or more transceivers, a signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication; identify a first location of a first reference signal source based on the common identifying information and the first distinct identifying information; identify a second location of a second reference signal source based on the common identifying information and the second distinct identifying information; and determine a range between the UE and the second reference signal source based on the signal strength indication, the first location of the first reference signal source, and the second location of the second reference signal source.

Another example network entity includes: means for receiving, at the network entity, a signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication; means for identifying, at the network entity, a first location of a first reference signal source based on the common identifying information and the first distinct identifying information; means for identifying, at the network entity, a second location of a second reference signal source based on the common identifying information and the second distinct identifying information; and means for determining a range between a UE and the second reference signal source based on the signal strength indication, the first location of the first reference signal source, and the second location of the second reference signal source.

Another example non-transitory, processor-readable storage medium includes processor-readable instructions to cause one or more processors, of a network entity, to: receive, at the network entity, a signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication; identify a first location of a first reference signal source based on the common identifying information and the first distinct identifying information; identify a second location of a second reference signal source based on the common identifying information and the second distinct identifying information; and determine a range between a UE and the second reference signal source based on the signal strength indication, the first location of the first reference signal source, and the second location of the second reference signal source.

Another example method of processing a signal source data set includes: receiving, at one or more network entities, the signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier; identifying a first location of the first signal source based on the first signal source identifier; identifying a second location of a second signal source based on the second signal source identifier and the first location of the first signal source; and determining a range between a user equipment (UE) and the second signal source based on the second signal strength indication, the first location of the first signal source, and the second location of the second signal source.

Another example network entity includes: one or more transceivers; one or more memories; and one or more processors, communicatively coupled to the one or more transceivers and the one or more memories, the one or more processors configured to: receive, via the one or more transceivers, a signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier; identify a first location of the first signal source based on the first signal source identifier; identify a second location of a second signal source based on the second signal source identifier and the first location of the first signal source; and determine a range between a user equipment (UE) and the second signal source based on the second signal strength indication, the first location of the first signal source, and the second location of the second signal source.

Another example network entity includes: means for receiving, at the network entity, a signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier; means for identifying a first location of the first signal source based on the first signal source identifier; means for identifying a second location of a second signal source based on the second signal source identifier and the first location of the first signal source; and means for determining a range between a user equipment (UE) and the second signal source based on the second signal strength indication, the first location of the first signal source, and the second location of the second signal source.

Another example non-transitory, processor-readable storage medium includes processor-readable instructions to cause one or more processors, of a network entity, to: receive, at the network entity, a signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier; identify a first location of the first signal source based on the first signal source identifier; identify a second location of a second signal source based on the second signal source identifier and the first location of the first signal source; and determine a range between a user equipment (UE) and the second signal source based on the second signal strength indication, the first location of the first signal source, and the second location of the second signal source.

DETAILED DESCRIPTION

Definitions

Figure 1:
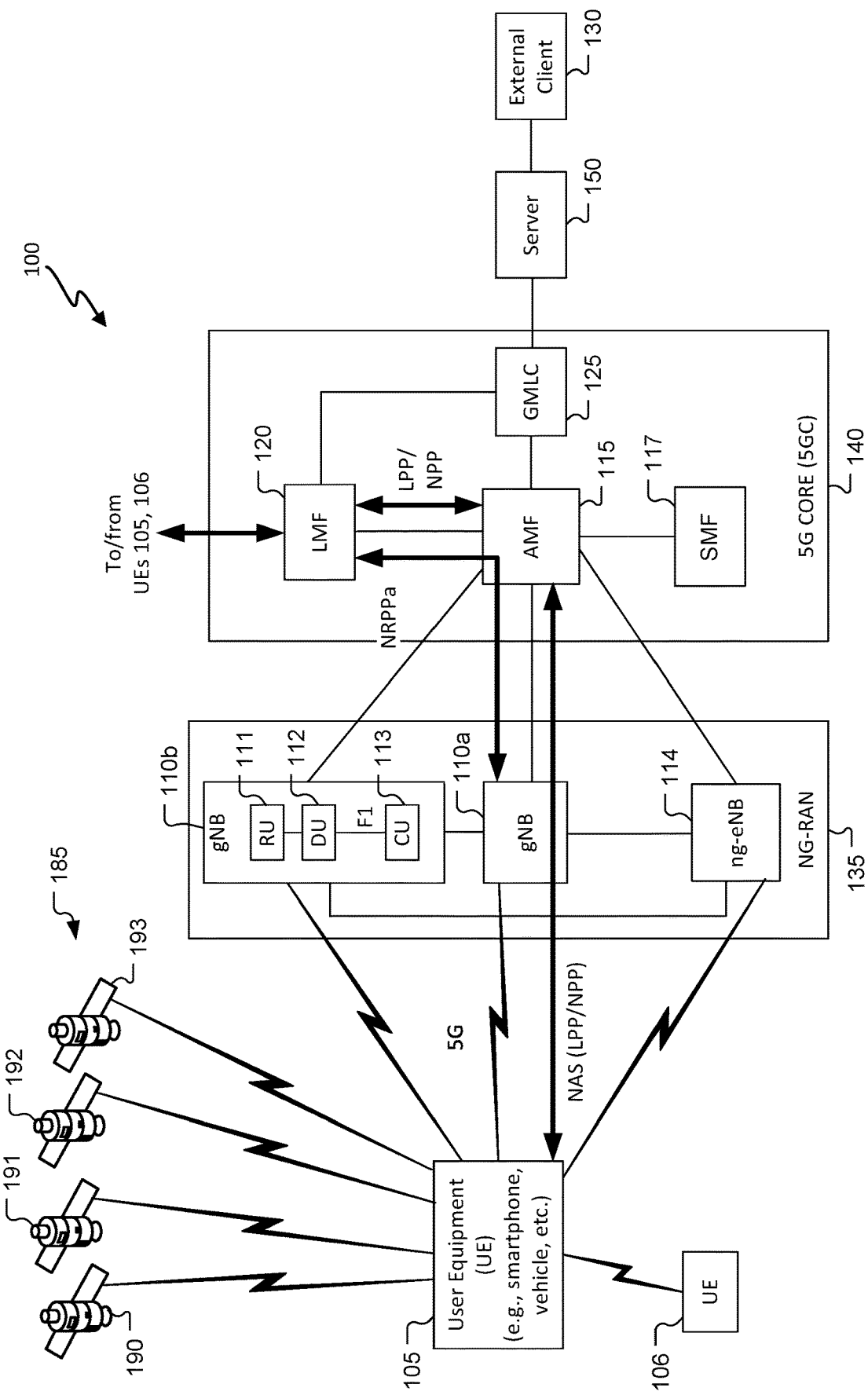
FIG. 1 is a simplified diagram of an example wireless communications system.

As used herein, "compression" means an operation that reduces a data size of a first data set that includes one or more signal source identifiers, while retaining, at least in part, an indication of each of the one or more signal source identifiers, to form a second data set (that has a smaller amount of data than the first data set, and thus may be called a reduced data set). Some compressions discussed herein are lossless, such that the one or more signal source identifiers of the first data set can be decompressed and recovered fully and uniquely. Other compressions discussed herein are lossy, such that a decompression of compressed data may not recover the one or more signal source identifiers of the first data set fully and uniquely (e.g., fewer than all of the one or more signal source identifiers of the first data set and/or recovered signal source identifiers that have less than all information of the one or more signal source identifiers of the first data set) such that the recovered signal source identifiers may not be unique.

As used herein, a "down-selection" means an operation that selects fewer than all items available for selection (e.g., reference signal source identifiers (any one of which may be compressed) from a signal source data set).

Many applications associated with mobile devices involve determining the geolocation of the mobile device. Example applications include mobile phone and in-vehicle navigation applications (apps), and consumer asset tracking devices for tracking packages, children, and pets. It may not be practical to use GPS/GNSS (Global Positioning System/Global Navigation Satellite System), which relies on on-device processing of satellite signals, for this purpose. In addition to or instead of GPS/GNSS systems, a mobile device may work with terrestrial positioning systems to measure local (relatively short range) radio signals (also referred to herein as reference signals), including, for example, WIFI® access point (AP) signals and cellular signal. Position information (e.g., measurement data, pseudoranges, position estimates, etc.) related to these signals, including transmitter IDs (also referred to herein as reference signal source identifiers) and signal strength levels (also referred to herein as signal strengths) may be determined. The position information may be sent (e.g., over the Internet) to a network entity (e.g., a cloud-based service device). The network entity may correlate the signal measurements and transmitter IDs against a database of transmitter locations (e.g., crowd-sourced location estimates of the transmitters) to compute an estimate of the geolocation of the mobile device.

The transmission of position information by the mobile device to the network entity uses resources that may be scarce, including battery power and network bandwidth. It may be desirable to limit the amount of network bandwidth used to send the position information to the network entity without significantly, or at all, decreasing the accuracy of the position estimate computed by the network entity. For example, IoT devices often communicate over wide-area networks that support only low data-rate communication (e.g., NB-IoT, LTE-M, LORA, SIGFOX, and other LPWAN networks). These devices are often battery powered and hence are designed to transmit minimal amounts of data on a daily basis. Location measurement payloads are often bundled with other application-specific payload data in a given transmission. Accordingly, reducing or even minimizing the size of the measurement payload is often very desirable in order to allow more application data to be included in a given transmission unit.

Techniques are discussed herein for transferring position information (e.g., positioning signal measurements, positioning signal source identifiers) in a resource-constrained environment. For example, data sets may be reduced using lossless compression (virtual access point compression), down-selection (or down-selection and filtering), and/or lossy compression for reducing bandwidth utilization for transmitting position information. These techniques may be used independently or in combination. For example, a reduced data set may be produced by a combination of compression and down-selection. Other configurations, however, may be used.

Items and/or techniques described herein may provide one or more of the following capabilities, as well as other capabilities not mentioned. UE position information may be obtained by a UE and a reduced data set, representative of the position information, may be provided from the UE, thus reducing bandwidth utilization for the data transmission compared to transmitting the position information. A reduced amount of data corresponding to position information may be transmitted by a UE to a network in a way that the position information may be recovered such that location accuracy is not compromised. Other capabilities may be provided, and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (cMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114 and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a. 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®)-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a. 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*. 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*. 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*. 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
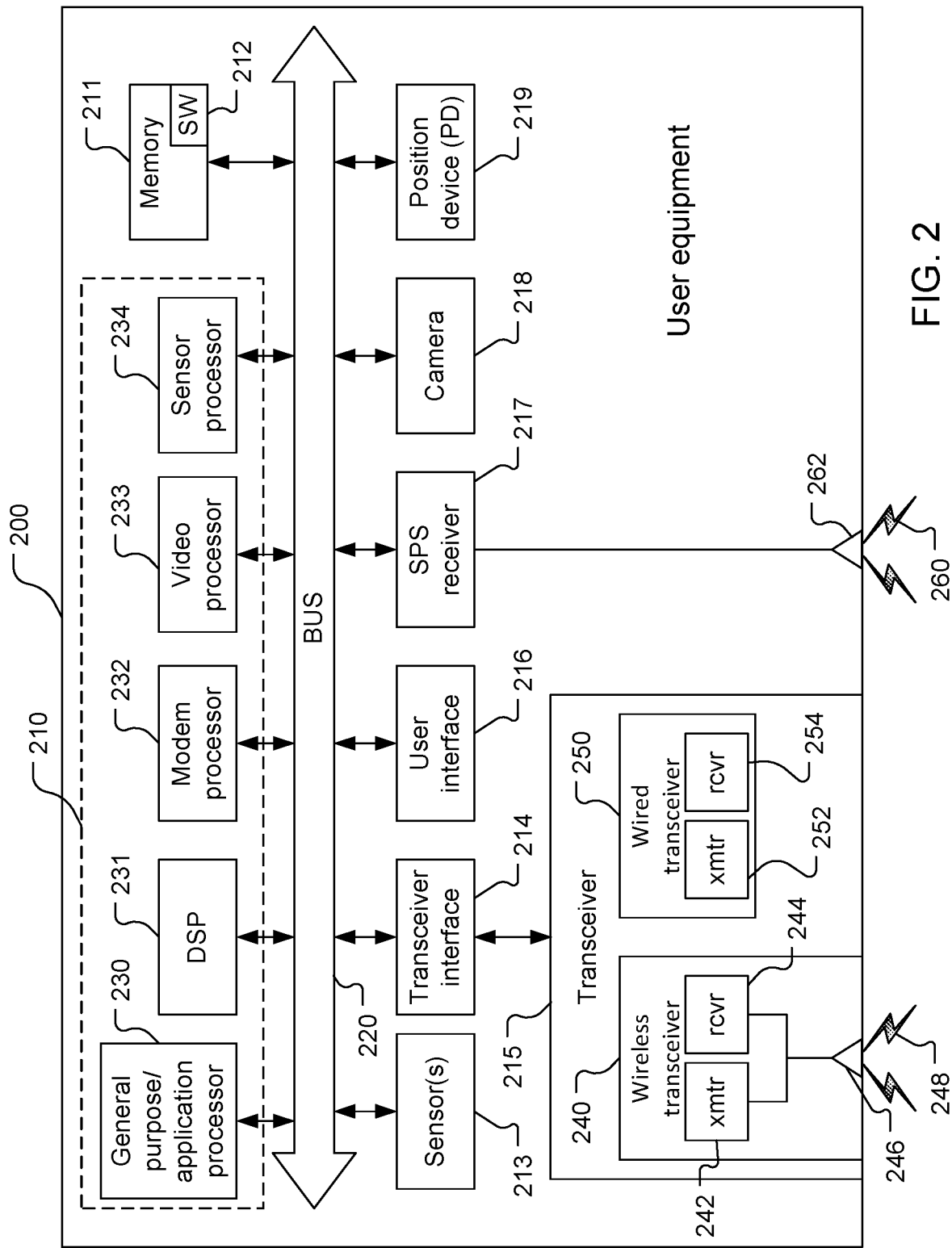
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
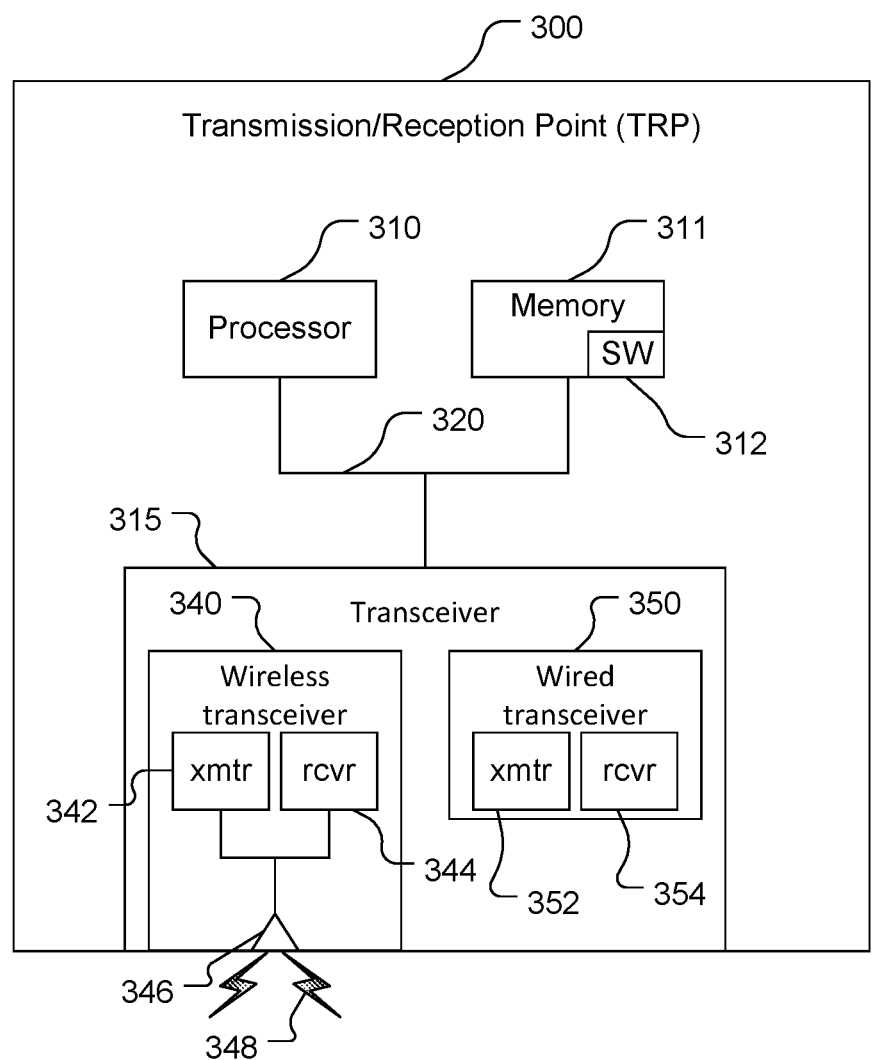
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
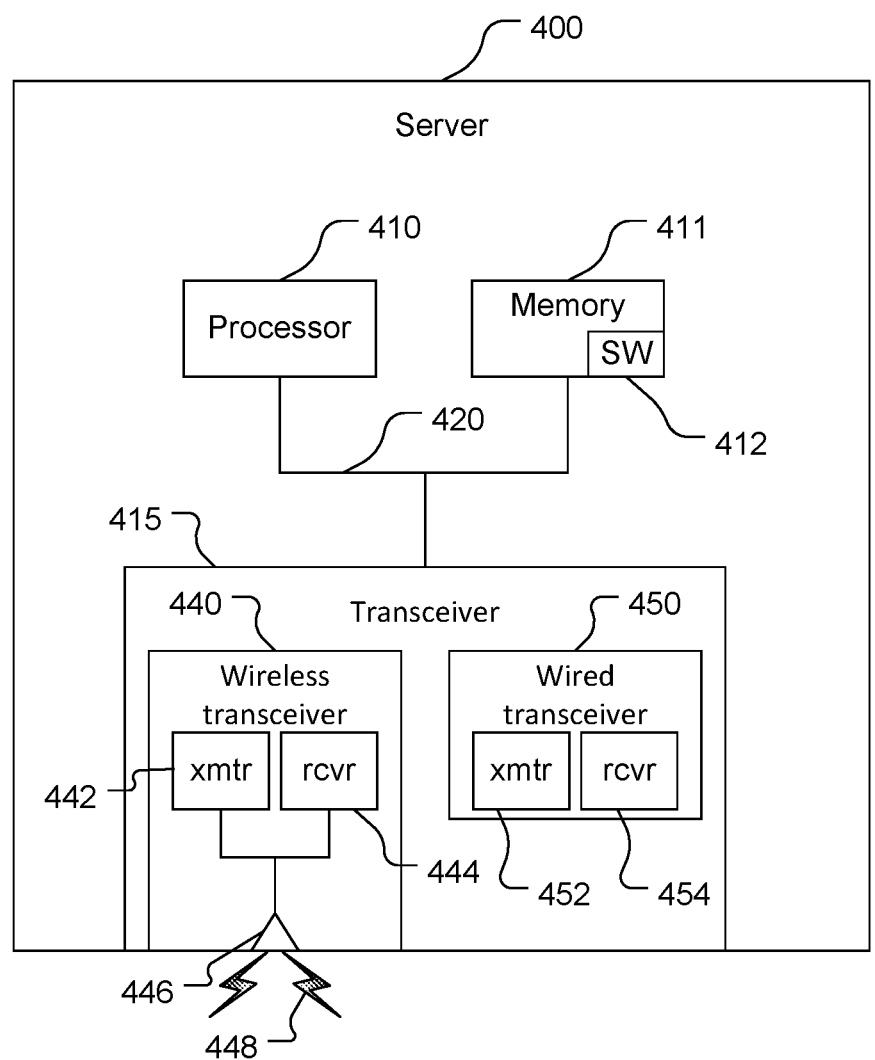
FIG. 4 is a block diagram of components of a server, various examples of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data.

An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, and subtracting the $UE_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-Positioning FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
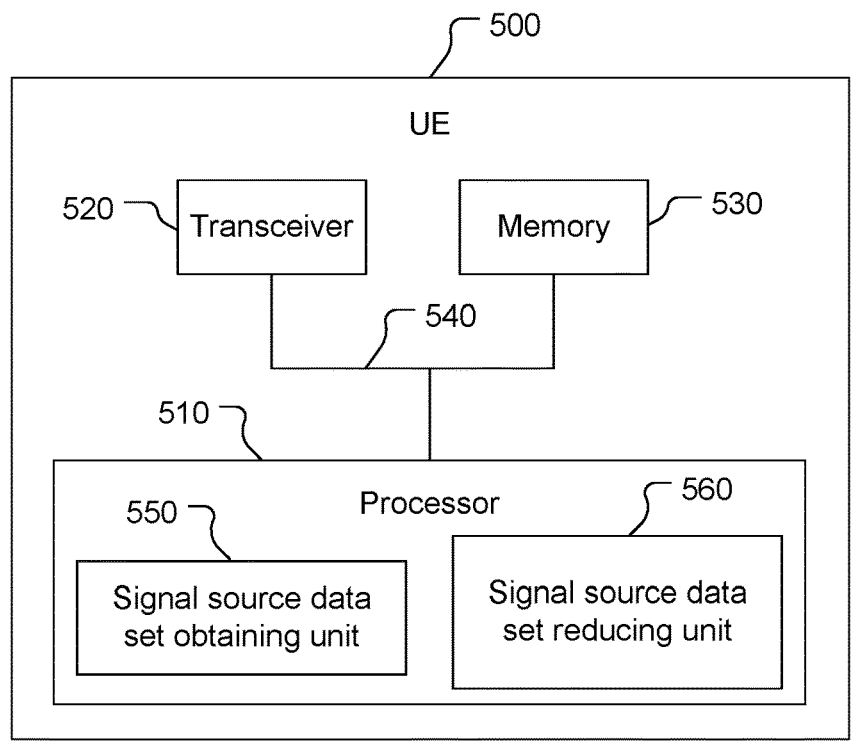
FIG. 5 is a simplified block diagram of an example user equipment.

Referring also to FIG. 5, an example UE 500 includes a processor 510, a transceiver 520, and a memory 530 communicatively coupled to each other by a bus 540. Even if referred to in the singular, the processor 510 may include one or more processors, the transceiver 520 may include one or more transceivers (e.g., one or more transmitters and/or one or more receivers), and the memory 530 may include one or more memories. The UE 500 may include the components shown in FIG. 5. The UE 500 may include one or more other components, such as any of those shown in FIG. 2, such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations, such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function.

The processor 510 (possibly in conjunction with the memory 530 and, as appropriate, the transceiver 520) may include a signal source data set obtaining unit 550. The signal source data set obtaining unit 550 may be configured to perform operations, e.g., receiving (via the transceiver 520), measuring, and decoding reference signals reference signals to obtain a signal source data set. The signal source data set may include, e.g., indications of sources of signals (e.g., APs) and corresponding received signal strengths (e.g., RSSIs). These operations are described in further detail herein, e.g., in connection with FIGS. 7 and 10-13.

The processor 510 (possibly in conjunction with the memory 530 and, as appropriate, the transceiver 520) may include a signal source data set reducing unit 560. The signal source data set reducing unit 560 may be configured to perform operations, e.g., producing a reduced signal source data set from the signal source data set obtained by the unit 550. The signal source data set reducing unit 560 may produce the reduced data set using, e.g., a compression, a down-selection, or both. These operations are described in further detail herein, e.g., in connection with FIGS. 7-13.

The description may refer to the processor 510 generally, or the UE 500 generally, as performing any of the functions of the signal source data set obtaining unit 550 and/or the signal source data set reducing unit 560, with the UE 500 being configured to perform the function(s).

Figure 6:
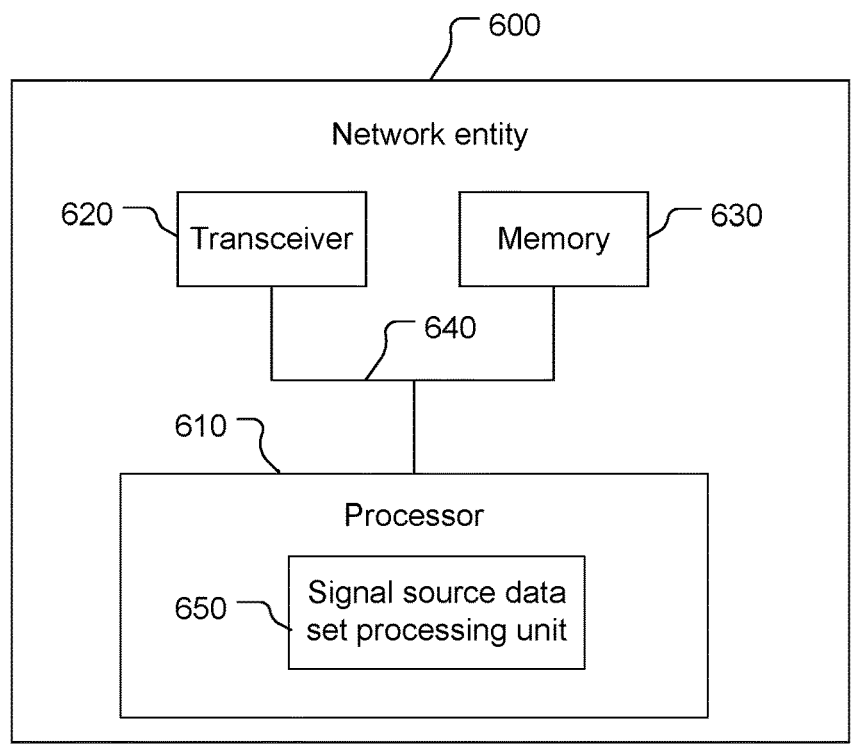
FIG. 6 is a simplified block diagram of an example network entity.

Referring also to FIG. 6, a network entity 600, which may be located in the cloud (or generally in a network location) includes a processor 610, a transceiver 620, and a memory 630 communicatively coupled to each other by a bus 640. Even if referred to in the singular, the network entity 600 may include one or more network entities, the processor 610 may include one or more processors, the transceiver 620 may include one or more transceivers (e.g., one or more transmitters and/or one or more receivers), and the memory 630 may include one or more memories. The network entity 600 may include the components shown in FIG. 6 and may be configured to be a component of a communication network (e.g., a terrestrial communication network such as a cellular network). The network entity 600 may include one or more other components such as any of those illustrated in FIG. 4, such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those illustrated in FIG. 3, such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a signal source data set processing unit 650. The description may refer to the processor 610 generally, or the network entity 600 generally, as performing any of the functions of the signal source data set processing unit 650, with the network entity 600 being configured to perform the function(s).

The signal source data set processing unit 650 may be configured to perform operations including receiving a reduced signal source data set and recovering a signal source data set from the reduced signal source data set. For example, the operations may include receiving a compressed reference signal source identifier, and comparing the compressed reference signal source identifier to stored compressed signal source identifiers to identify a matching compressed signal source identifier. As another example, the operations may also or alternatively include recovering a full reference signal source identifier from a compressed reference signal source identifier. These operations are described in further detail herein, e.g., in connection with FIGS. 8-13.

Figure 7:
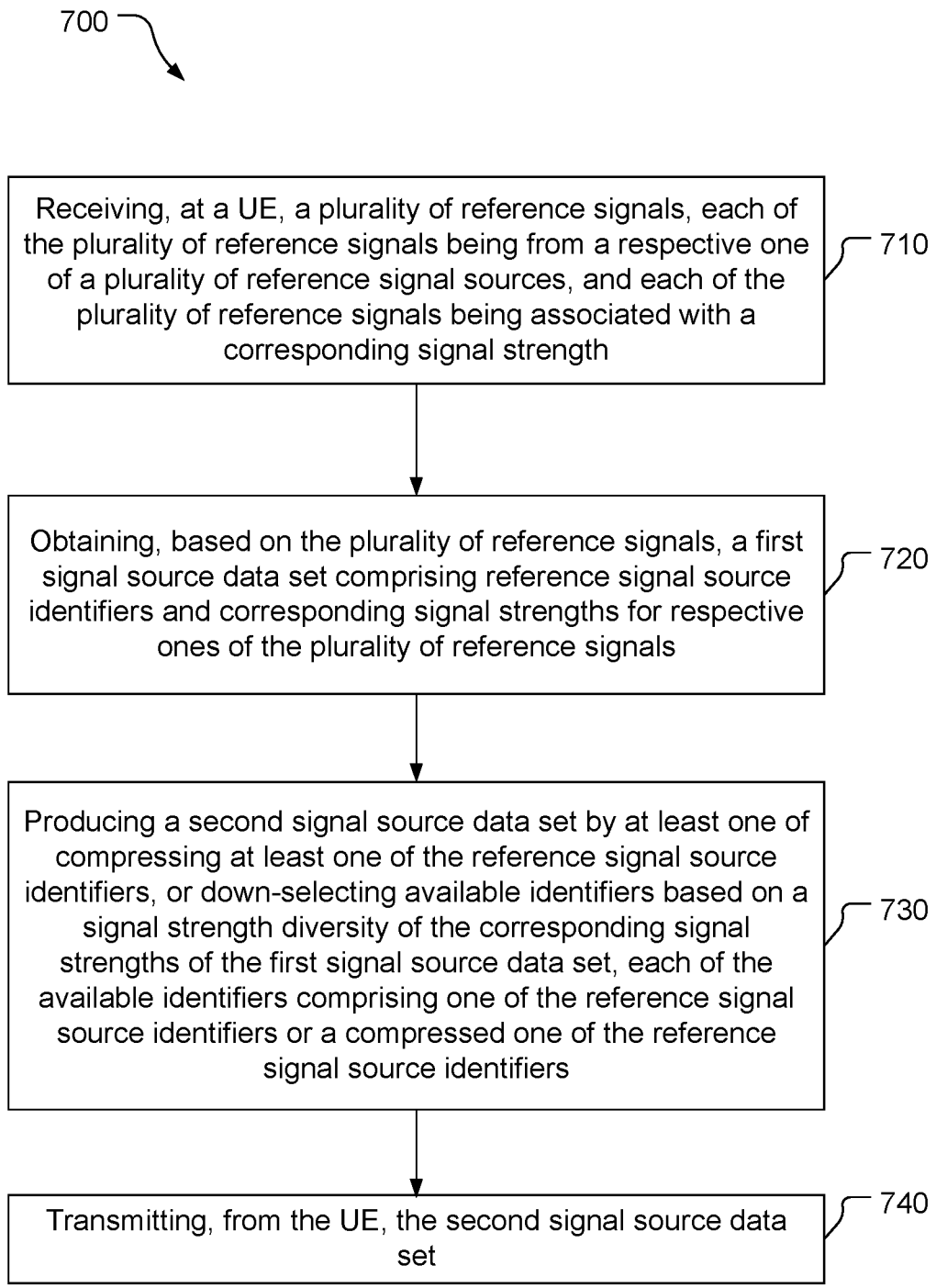
FIG. 7 is block flow diagram illustrating an example procedure for providing UE position information.

FIG. 7 is a flow diagram illustrating an example method 700 for providing UE position information. The method 700 is, however, an example and not limiting. The method 700 may be altered, e.g., by having one or more stages added, removed, rearranged, combined, performed concurrently, and/or having single stages split into multiple stages.

Figure 13:
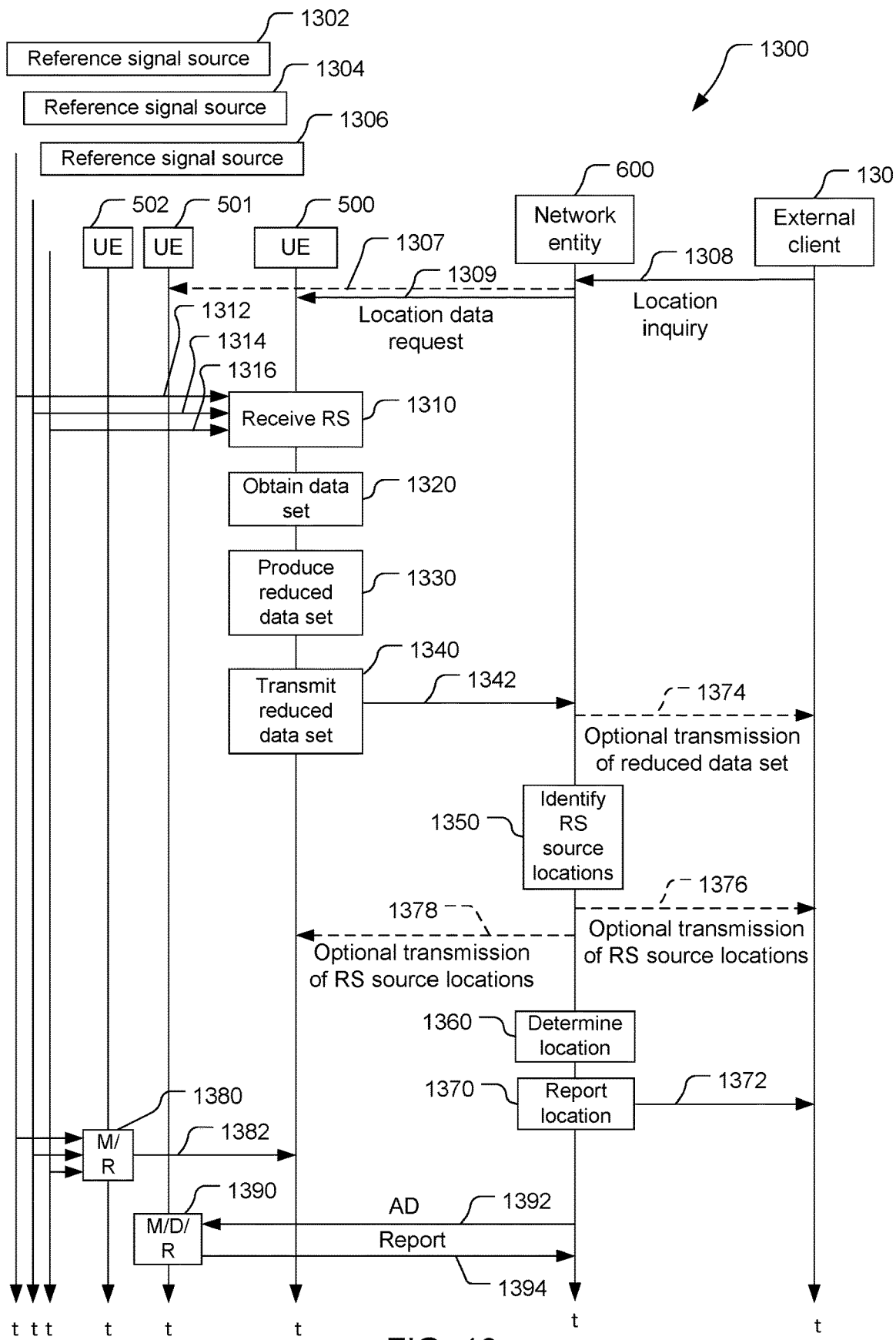
FIG. 13 is an example of a signaling and processing flow for determining position information for a UE, illustrating flow options for a network entity, an external client, and/or the UE to receive information for the determination of the UE position.

At stage 710, the method 700 includes receiving, at a UE, a plurality of reference signals, each of the plurality of reference signals being from a respective one of a plurality of reference signal sources, and each of the plurality of reference signals being associated with a corresponding signal strength. For example, the UE 500, e.g., the signal source data set obtaining unit 550 may receive reference signals 1312, 1314, 1316 from RS sources 1302, 1304, 1306 as shown in FIG. 13. Each of the reference signals 1312, 1314, 1316 is from a respective one of the reference signal sources 1302, 1304, 1306, each of which may be an AP, a mobile device providing cellular signal transmissions, or both, for example. In addition, each of the reference signals 1312, 1314, 1316 has a respective signal strength. The processor 510, possibly in combination with the memory 530, in combination with the transceiver 520 (e.g., the wireless receiver 244 and the antenna 246) may comprise means for receiving the reference signals.

At stage 720, the method 700 includes obtaining, based on the plurality of reference signals, a first signal source data set comprising reference signal source identifiers and corresponding signal strengths for respective ones of the plurality of reference signals. For example, a first signal source data set is obtained based on the measurement and decoding of the reference signals 1312, 1314, 1316 received at stage 710.

Figure 10:
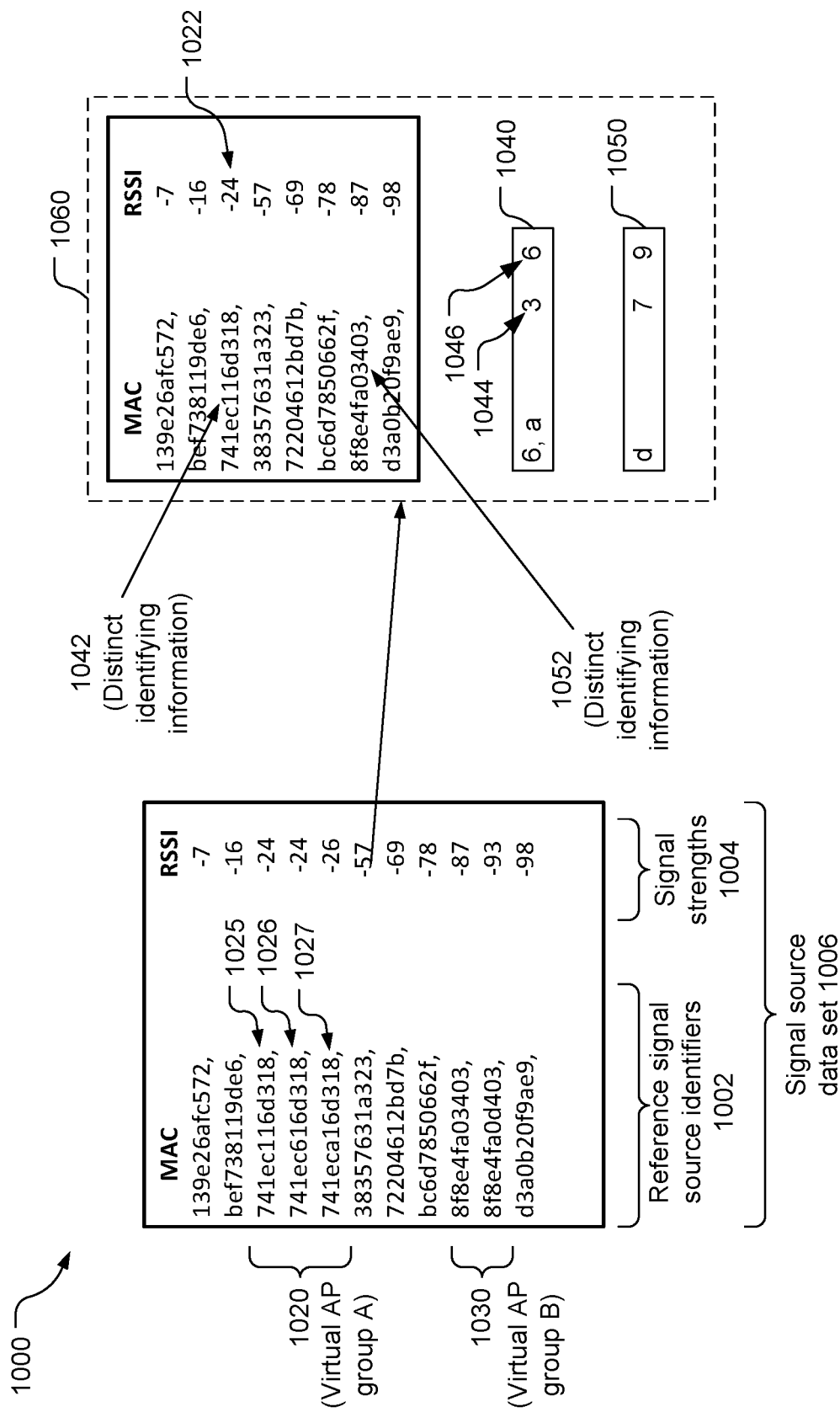
FIG. 10 is a schematic diagram illustrating an example of the procedure of FIG. 7 that includes compressing by removing common identifying information from one or more signal source identifiers in a group of identifiers.
Figure 11:
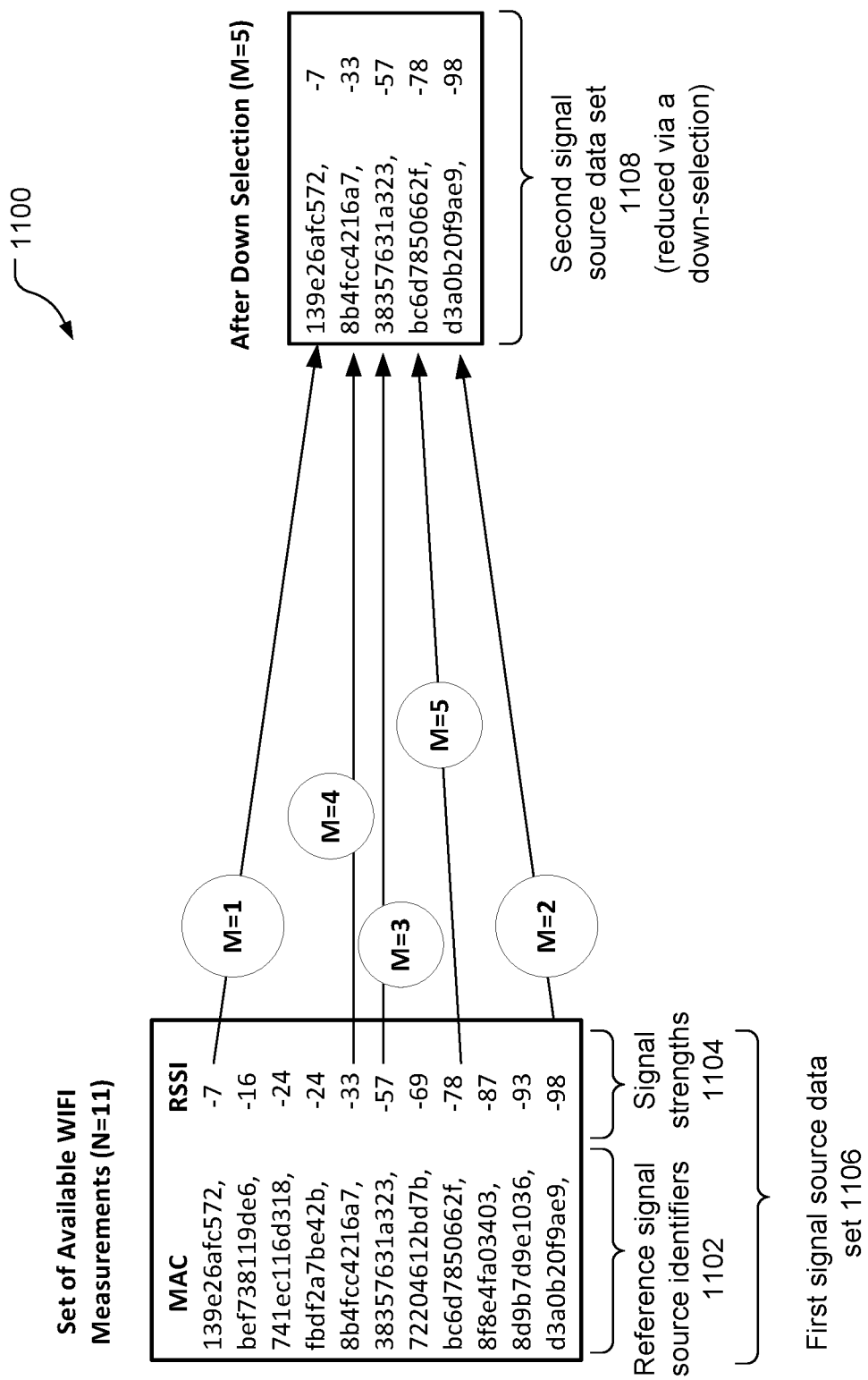
FIG. 11 is a schematic diagram illustrating an example of the procedure of FIG. 7 that includes down-selection from a group of signal source identifiers.

The measurements may yield signal strengths for the reference signals 1312, 1314, 1316 and decoding may yield the source identifier for each of reference signals 1312, 1314, 1316. The first signal source data set may comprise reference signal source identifiers and corresponding signal strengths for respective ones of the reference signals 1312, 1314, 1316, as illustrated in FIGS. 10-11, for example. The first signal source data set may include a source identifier and a signal strength for all reference signals received, or may include a source identifier and a signal strength for fewer than all reference signals received. The processor 510, possibly in combination with the memory 530, may comprise means for obtaining the first signal source data set.

Figure 12:
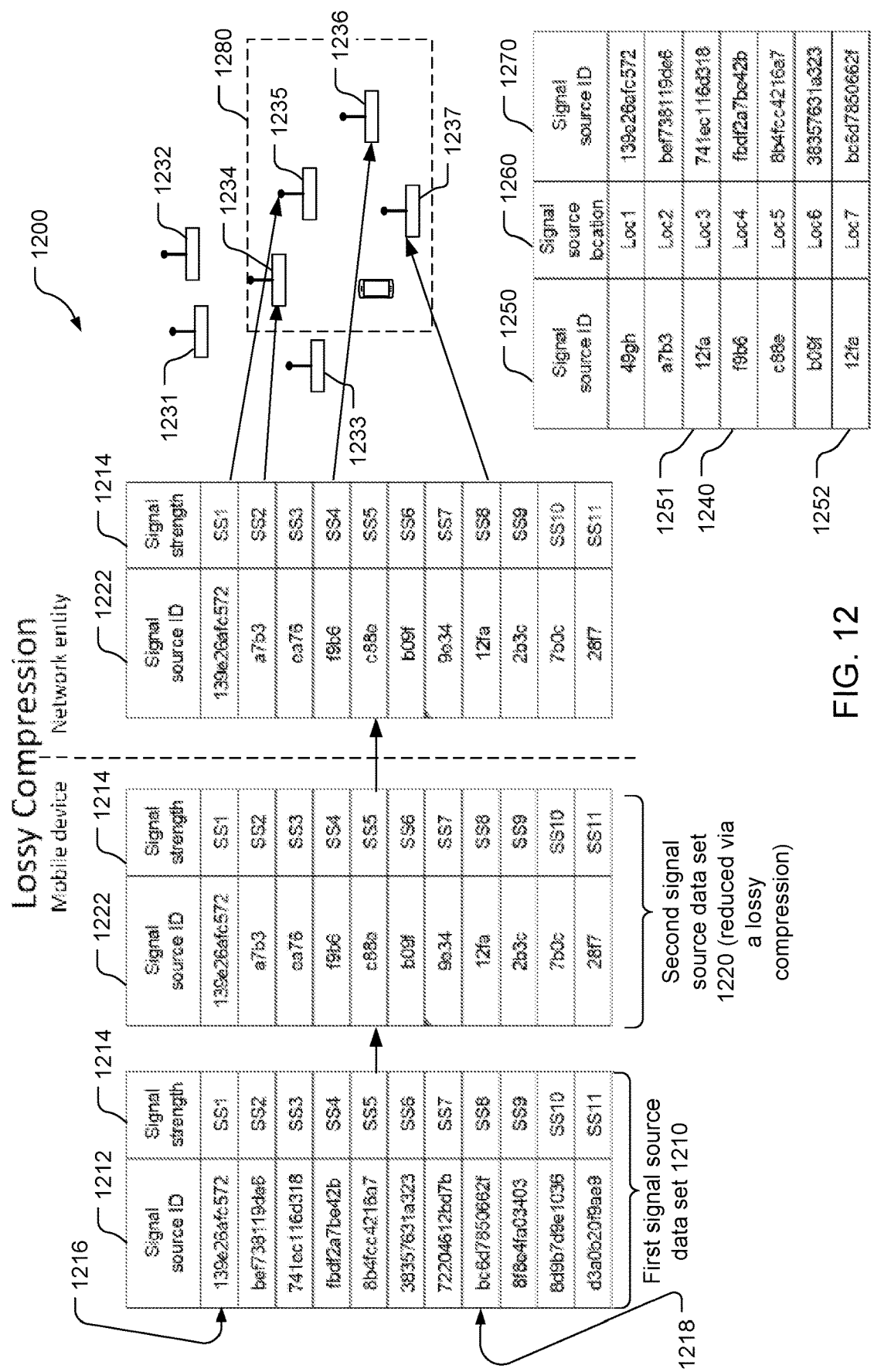
FIG. 12 is a schematic diagram illustrating an example of the procedure of FIG. 7 that includes compressing using a lossy compression.

At stage 730, the method 700 includes producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers. For example, the UE 500, e.g., the signal source data set reducing unit 560, may produce a reduced signal source data set based on the first signal source data set. For example, the unit 560 may perform a lossless compression, a lossy compression, and/or a down-selection of the first signal source data set to determine the second signal source data set. Example reduced signal source data sets are illustrated in FIGS. 10-12. The second signal source data set is a reduced data set in that the second signal source data set may have a smaller data size than the first signal source data set. This reduction in data size may be carried out by at least one of (i) compressing at least one of the reference signal source identifiers (e.g., compression via virtual AP collapsing, as discussed with respect to FIG. 10, or via a lossy compression, as discussed with respect to FIG. 12), or (ii) down-selecting available identifiers while preserving a maximum signal strength diversity of the full signal source data set (e.g., as discussed with respect to FIG. 11). Each of the available identifiers includes an uncompressed one of the reference signal source identifiers or a compressed one of the reference signal source identifiers (e.g., if compression has already occurred, such as in FIG. 10 or FIG. 11, and down-selection is to be performed in addition to the compression). The processor 510, possibly in combination with the memory 530, may comprise means for producing the second signal source data set.

At stage 740, the method 700 includes transmitting, from the UE, the second signal source data set. For example, the UE 500, e.g., the signal source data set reducing unit 560, may transmit a reduced signal source data set 1342 from the UE 500 to the network entity 600. The processor 510, possibly in combination with the memory 530, in combination with the transceiver 520 (e.g., the wireless transmitter 242 and the antenna 246) may comprise means for transmitting the second signal source data set.

Implementations of the method 700 may include one or more of the following features. In an example implementation, producing the second signal source data set includes compressing at least one of the reference signal source identifiers, wherein the first signal source data set includes a first reference signal source identifier and a second reference signal source identifier each with common identifying information and each with respective distinct identifying information, and wherein the second signal source data set includes the common identifying information and the respective distinct identifying information for the first reference signal source identifier and less than all, if any, of the common identifying information for the second reference signal source identifier. The processor 510, possibly in combination with the memory 530, may comprise means for compressing at least one of the reference signal source identifiers. In a further example implementation, the second signal source data set includes only one indication of the common identifying information for the first reference signal source identifier and the second reference signal source identifier combined. In another further example implementation, the first reference signal source identifier and the second reference signal source identifier are part of a plurality of the reference signal source identifiers that include the common identifying information, and the second signal source data set includes an average signal strength associated with the plurality of the reference signal source identifiers. These features are illustrated by way of example in FIG. 10.

Also or alternatively, implementations of the method 700 may include one or more of the following features. In an example implementation, producing the second signal source data set includes a lossy compression of one or more of the reference signal source identifiers, and the second signal source data set includes a unique identifier of at least one of the reference signal source identifiers. The unique identifier may include an entirety of the at least one of the reference signal source identifiers. For example, lossy compression is illustrated in the example of FIG. 12.

Alternatively, or in addition, implementations of the method 700 may include one or more of the following features. In an example implementation, producing the second signal source data set includes down-selecting the available identifiers, where the available identifiers consist of N available identifiers, and the second signal source data set includes exactly M second-set reference signal source identifiers, where N and M are integers and M<N, and where the M second-set reference signal source identifiers include: an M=1 second-set reference signal source identifier corresponding to an M=1 signal strength that is a strongest signal strength of second-set signal strengths corresponding to the M second-set reference signal source identifiers; an M=2 second-set reference signal source identifier corresponding to an M=2 signal strength that is a weakest signal strength of the second-set signal strengths; an M=3 second-set reference signal source identifier corresponding to an M=3 signal strength of the second-set signal strengths that is between, and differs most from, the M=1 and M=2 signal strengths; and an M=4 second-set reference signal source identifier corresponding to an M=4 signal strength of the second-set signal strengths that is between, and differs most from, the M=3 signal strength and either the M=1 signal strength or the M=2 signal strength. An example down-selection embodiment is illustrated in FIG. 11. The processor 510, possibly in combination with the memory 530, may comprise means for down-selecting the available identifiers. In a further example implementation, the down-selecting includes filtering out one or more of the available identifiers that each corresponds to a mobile access point. For example, down-selection of available identifiers may be performed to reduce data size for transmission while preserving (possibly full) signal strength diversity (and, thus, geographic diversity) of the reported data.

Figure 8:
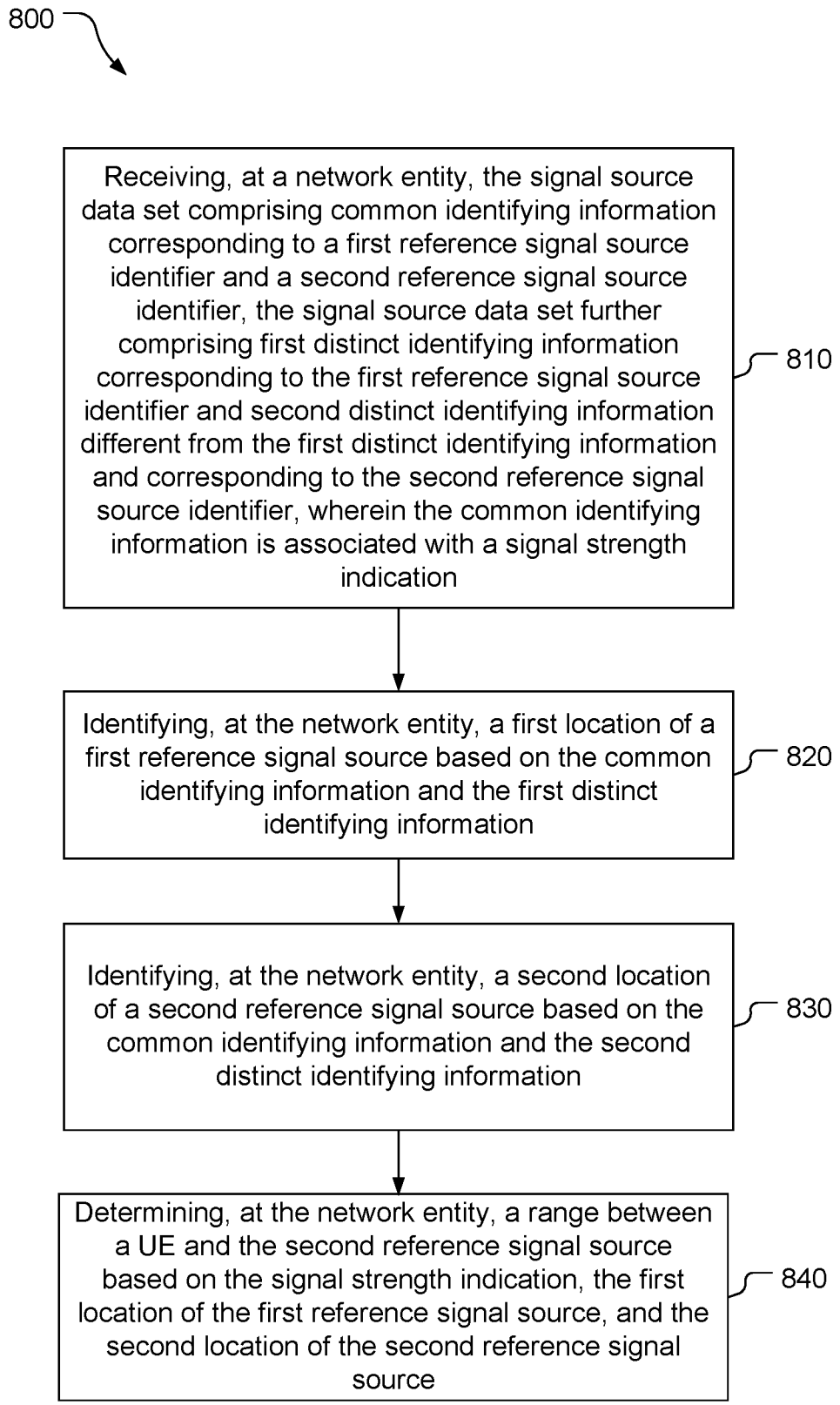
FIG. 8 is block flow diagram illustrating an example procedure for processing a signal source data set.

FIG. 8 is a flow diagram illustrating an example method 800 for processing a signal source data set at a network entity. The method 800 is, however, an example and not limiting. The method 800 may be altered, e.g., by having one or more stages added, removed, rearranged, combined, performed concurrently, and/or having single stages split into multiple stages.

At stage 810, the method 800 includes receiving, at a network entity, the signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier. For example, a reduced signal source data set, such as a compressed data set as illustrated in FIG. 10, is received at the network entity 600, as illustrated and discussed with respect to stage 1330 shown in FIG. 13. Receiving the signal source data set may be from a UE, either directly or indirectly. The signal source data set may have been reduced in data size with respect to another signal source data set, such as via the method 700 or the more particular example procedure of FIG. 10. Example common identifying information and example distinct identifying information are illustrated in FIG. 10. The processor 610, possibly in combination with the memory 630, in combination with the transceiver 620 (e.g., the wireless receiver 344 and the antenna 346, and/or the wired receiver 354, or the wireless receiver 444 and the antenna 446, and/or the wired receiver 454) may comprise means for receiving the signal source data set.

At stage 820, the method 800 includes identifying, at the network entity, a first location of a first reference signal source based on the common identifying information and the first distinct identifying information. For example, the signal source data set processing unit 650 may determine a first full signal source identifier of the first reference signal source by combining the common identifying information and the first distinct identifying information to form the full signal source identifier. The unit 650 may determine a location of the first reference signal source using the first full signal source identifier, e.g., by looking up the first full signal source identifier in a look-up table (e.g., stored in the memory 630) of signal source identifiers and corresponding signal source locations. The processor 610, possibly in combination with the memory 630, may comprise means for identifying the first location of the first reference signal source.

At stage 830, the method 800 includes identifying, at the network entity, a second location of a second reference signal source based on the common identifying information and the second distinct identifying information. For example, the signal source data set processing unit 650 may determine a second full signal source identifier of the second reference signal source by combining the common identifying information and the second distinct identifying information to form the second full signal source identifier. The unit 650 may determine a location of the first reference signal source using the full signal source identifier, e.g., by looking up the second full signal source identifier in the look-up table of signal source identifiers and corresponding signal source locations. The processor 610, possibly in combination with the memory 630, may comprise means for identifying the second location of the second reference signal source.

At stage 840, the method 800 includes determining a range between a UE and the second signal source based on the second signal strength indication, the first location of the first signal source, and the second location of the second signal source. For example, the signal source data set processing unit 650 may determine the range. The processor 610, possibly in combination with the memory 630, may comprise means for determining the range.

Implementations of the method 800 may include one or more of the following features. In an example implementation, the common identifying information is associated with a signal strength indication, and wherein the method comprises determining a range between the UE and the second reference signal source based on the signal strength indication. For example, the signal source data set processing unit 650 may use a signal strength corresponding to the common identifying information as the signal strength of reference signals received by the UE 500 from each of the first and second reference signal sources. The signal source data set processing unit 650 may determine a range between the UE 500 and each of the reference signal sources using this signal strength. The processor 610, possibly in combination with the memory 630, may comprise means for determining a range between the UE and the second reference signal source. The network entity 600 may determine a position estimate for the UE 500 based on respective ranges to multiple reference signal sources and locations of the reference signal sources. The network entity 600 may determine reference signal source identifiers using the common identifying information and respective distinct identifying information to determine reference signal source identifiers. The network entity 600 may determine reference signal source locations by looking up the reference signal source identifiers in a look-up table (e.g., stored in the memory 630) of signal source identifiers and corresponding signal source locations.

Figure 9:
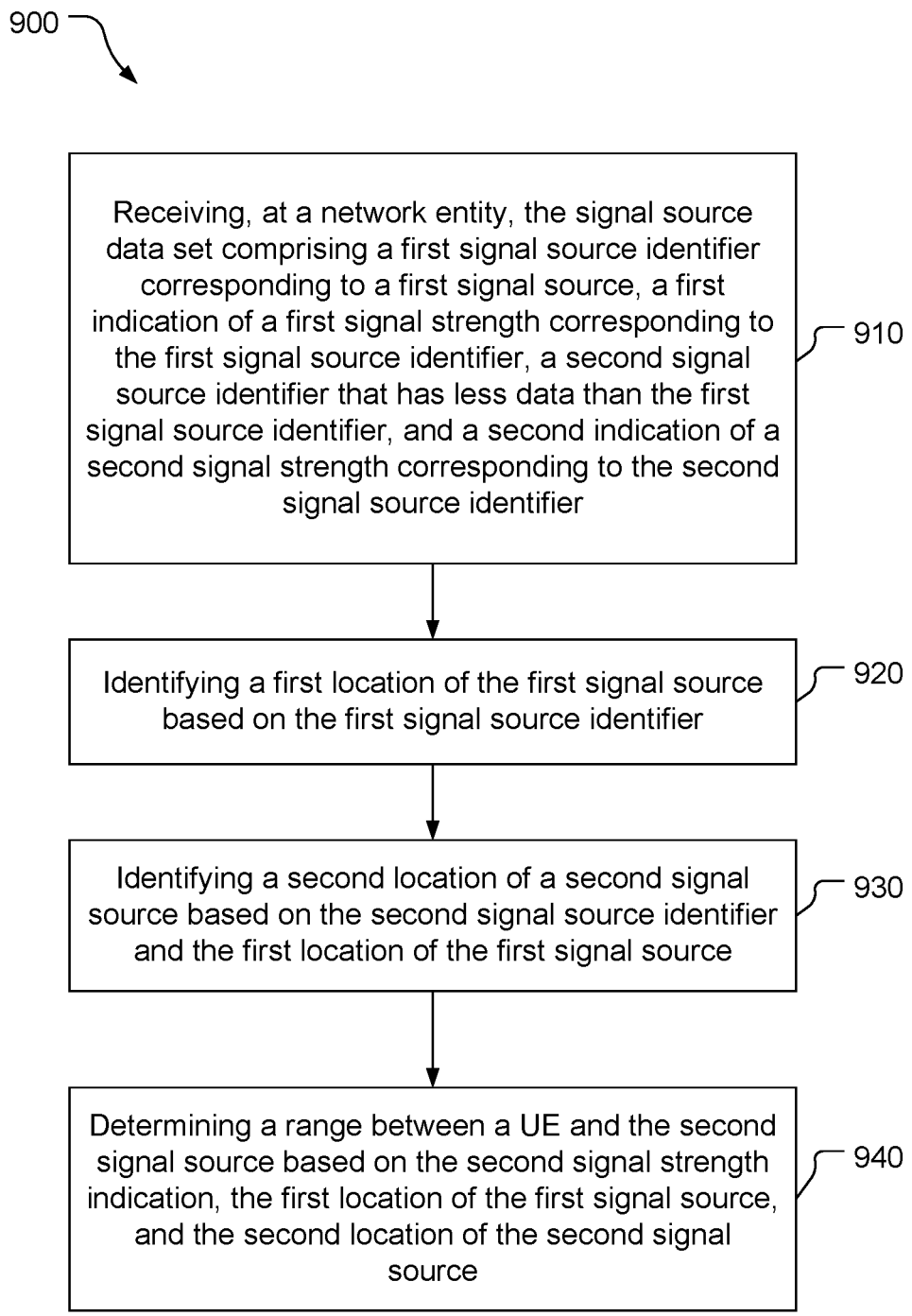
FIG. 9 is block flow diagram illustrating an alternative example procedure for processing a signal source data set.

FIG. 9 is a flow diagram illustrating another example method 900 for processing a signal source data set at a network entity. The method 900 is, however, an example only and not limiting. The method 900 may be altered, e.g., by having one or more stages added, removed, rearranged, combined, performed concurrently, and/or by having one or more single stages split into multiple stages.

At stage 910, the method 900 includes receiving, at a network entity, the signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier. For example, the network entity 600 may receive, from the UE 500, a signal source data set that includes a full reference signal source identifier (which may be a unique identifier) and a compressed reference signal source identifier, and associated signal strengths of reference signals received by the UE 500 from the respective signal sources. The compressed identifier may be, for example, a compressed (e.g., hashed) MAC address such as one of the compressed MAC addresses as illustrated in FIG. 12. The compressed identifier may be compressed via a compression function, such as a hashing function for example, that is applied to a full reference signal source identifier at the UE 500 (e.g., by the signal source data set reducing unit 560) and transmitted by the UE 500, as illustrated in transmissions of FIG. 12 and FIG. 13.

At stage 920, the method 900 includes identifying a first location of the first signal source based on the first signal source identifier. For example, the signal source data set processing unit 650 may use a full signal source identifier to determine a location of the corresponding signal source, e.g., by looking up the full signal source identifier in a look-up table (e.g., stored in the memory 630) of signal source identifiers and corresponding signal source locations. The processor 610, possibly in combination with the memory 630, may comprise means for identifying the first location of the first reference signal source.

At stage 930, the method 900 includes identifying a second location of a second signal source based on the second signal source identifier and the first location of the first signal source. For example, the signal source data set processing unit 650 may use a compressed (e.g., hashed) signal source identifier to determine a location of the corresponding signal source, e.g., by looking up the compressed signal source identifier in a look-up table (e.g., stored in the memory 630) of compressed signal source identifiers and corresponding signal source locations, and possibly corresponding full signal source identifiers. A full reference signal source identifier may be compressed via a lossy compression to yield the compressed signal source identifier. The compression function can be a lossy compression function in the sense that the full reference signal source identifier may not be identifiable solely from information available in the compressed signal source identifier, as received from the UE 500 by the network entity 600. As the same compressed signal source identifier may correspond to multiple full signal source identifiers (i.e., correspond to multiple signal sources), the unit 650 may choose one location from multiple identified locations (e.g., by ignoring one or more identified locations). The second location may be assigned based on a high degree of certainty, even if less than 100% certainty, that the signal source corresponding to the second location accurately corresponds to a signal source from which the UE 500 received a signal corresponding to the compressed signal source identifier transmitted by the UE 500 to the network entity 600. Embodiments encompassed by procedure 900 may be further understood in reference to FIG. 12. The processor 610, possibly in combination with the memory 630, may comprise means for identifying the second location of the second reference signal source.

At stage 940, the method 900 includes determining a range between a UE and the second signal source based on the second signal strength indication, the first location of the first signal source, and the second location of the second signal source. For example, the signal source data set processing unit 650 may determine the range. The processor 610, possibly in combination with the memory 630, may comprise means for determining the range.

Implementations of the method 900 may include one or more of the following features. In an example implementation, identifying the second location of the second signal source comprises determining that the second location is within a threshold perimeter of the first location of the first signal source. For example, the signal source data set processing unit 650 may determine the second location as the location that corresponds to the compressed signal source identifier and that is within the perimeter of the first location, with it likely being that only one such location will exist. If more than one signal source location meets these criteria, then the perimeter may be reduced until only one signal source location meets the criteria. The processor 610, possibly in combination with the memory 630, may comprise means for determining that the second location is within the threshold perimeter. In a further example implantation, identifying the second location of the second signal source comprises ignoring a third signal source having a corresponding third signal source identifier that matches the second signal source identifier and that has a corresponding third location that is outside the threshold perimeter of the first location of the first signal source. For example, the signal source data set processing unit 650 may ignore locations (corresponding to a compressed signal source identifier) that are outside of a perimeter around the location of the first signal source. The processor 610, possibly in combination with the memory 630, may comprise means for ignoring a signal source having a corresponding signal source identifier that matches the second signal source identifier and that has a corresponding location outside the threshold perimeter of the first location.

FIG. 10 is a schematic diagram illustrating a virtual collapsing method 1000 that is a specific example of the method 700 shown in FIG. 7. The method 1000 includes compressing by removing common identifying information from one or more signal source identifiers in a group of identifiers for transmission. The method 1000 may be referred to herein as "virtual collapsing" or "virtual AP collapsing" and is illustrated for a set of WiFi® access point (AP) measurements. While examples are illustrated herein for WiFi® signals, such as in FIGS. 10-12, the same technique or similar techniques can be readily applied to other types of signal transmissions such as cellular transmissions, BLE, Ultra-Wideband (UWB), and radio-frequency identification (RFID) transmissions, etc. Virtual collapsing may involve sending indications of multiple reference signal sources using less data (e.g., fewer bits) than that of full identifiers of the multiple signal sources. For example, the signal source data set reducing unit 560 may be configured to transmit, for a group of signal sources of signal source identifiers that have common information (one or more portions of the respective identifiers being identical), the common information once and information distinctly identifying each of the signals sources of the group. Virtual collapsing may also or alternatively involve sending only one measurement for each signal source in a group of signal sources, e.g., that have signal source identifiers with one or more portions of common information. In the example shown in FIG. 10, multiple signal sources with respective identifies that include common information may be called a virtual AP group. For example, a signal source data set 1006 comprises a virtual AP group 1020 (also called virtual AP group A) and a virtual group 1030 (also called virtual AP group B). Members of virtual AP groups may appear to mobile devices to be distinct access points, but may in fact correspond to a single physical access point (and therefore one physical radio transmitter). The members of a virtual group may not be identified in an entirely deterministic way in which the members of the virtual group can be identified as such, but signal source identifiers with significant common information may be reliably identified as corresponding to virtual group members. For example, if a 6-byte MAC addresses of APs (e.g., reference signal source identifiers 1002) differ by only a single 4-bit nibble, then the APs may be reliably assumed to be members of the same virtual group and correspond to the same physical transmitter.

A signal source data set may have multiple, distinct virtual groups of signal sources. For each distinct group, one group member may be designated as a parent member, e.g., the group member with the lowest MAC address value. The other group members may be referred to as children. The UE 500, e.g., the signal source data set reducing unit 560 may transmit a signal source identifier of the parent group member and a corresponding signal measurement to the network entity 600. For example, the unit 560 may transmit a full 6-byte MAC address of the parent group member and a respective RSSI measurement as part of a reduced, compressed signal source data set. The signal source data set reducing unit 560 may determine the signal measurement for the parent group member based on (e.g., a combination of) the measurements of signals from all of the signal sources in the group, e.g., to be the average RSSI measurement across all members of the virtual group). For example, a measurement value 1022 for the virtual group 1020 may be −24 dB, which is an average (rounding up) of measurement values of −24, −24, and −26 corresponding to the members of the virtual group 1020. The signal source data set reducing unit 560 may transmit, of each child group member, less data than a full signal source identifier and signal measurement for the respective child group member. For example, the unit 560 may transmit only signal source identifier information for each child group member that differs from the signal source identifier of the parent group member. A signal measurement for each child group member may also be transmitted, or may be combined with the signal measurement for the parent group member (and other child group member(s)). Information for child group members may thus also be transmitted to the network entity 600 using less network bandwidth than transmitting full signal source identifiers and signal measurements, e.g., since only the differing 4-bit nibble, and not the entire 6-byte MAC address, is sent and/or by not sending the individual signal measurement(s). While the complete signal source identifier may not be sent in whole, the complete signal source identifier may be reconstructed, and thus the compression of virtual collapsing may be called a lossless compression. Compression by virtual collapsing may include sending only one measurement for each set of signal sources that are part of a virtual group.

In the specific example compression via virtual AP collapsing illustrated in FIG. 10, the UE 500, e.g., the signal source data set obtaining unit 550, may obtain a signal source data set 1006 that includes reference signal source identifiers 1002 and corresponding signal strengths 1004. In the data set 1006, the signal strengths 1004 are RSSI measurements. However, more generally, signal strengths 1004, as received and evaluated at the UE 500, can be measured and designated in various ways. Also or alternatively, measurements other than signal strength measurements may be obtained for use in determining ranges between the UE 500 and the signal sources, and thus for use in determining a position estimate of the UE 500. The signal source data set obtaining unit 550 may obtain more data measurements than shown in the data set 1006. For example, the data set 1006 may not contain measurements that were made by the UE 500 that were below a threshold signal strength.

The UE 500, e.g., the signal source data set reducing unit 560 may identify a reduced data set, relative to the data set 1006, for transmission to the network entity 600, e.g., to save processing energy, processing time, and transmission bandwidth for reporting data for use in determining a position estimate for the UE 500. For example, the unit 560 may identify the two virtual AP groups 1020, 1030. In the virtual AP Group 1020, which includes three reference signal source identifiers 1002, all bits of each of the three MAC addresses are the same, with the exception of a single nibble in each signal source identifier, namely "1," "6," and "a," at the same bit position (here, the sixth-bit position) in each of respective signal source identifiers 1025, 1026, 1027 in the virtual AP group 1020. In this manner, it may be recognized that the three reference signal source identifiers 1002 of the virtual AP Group 1020 correspond to a single physical access point, and therefore, one physical radio transmitter. As further evidence of this fact, all signal strengths 1004 corresponding to the virtual AP Group 1020 are similar or the same. The signal source data set reducing unit 560 may select the signal source identifier 1025 as a parent signal source identifier, and the signal source identifiers 1026, 1027 as children signal source identifiers.

The signal source data set reducing unit 560 may transmit a reduced signal source data set 1060 with less data than the data set 1006 and from which each signal source identifier 1002 of the data set 1006 can be uniquely reconstructed and recovered. For example, for the virtual AP Group 1020, the signal source data set reducing unit 560 may transmit common information for the signal source identifiers only once. For example, the signal source data set reducing unit 560 may transmit the signal source identifier 1025 for the parent signal source, having mostly common identifying information for the three signal source identifiers 1025-1027, and only two additional nibbles "6" and "a" from the signal source identifiers 1026, 1027 (i.e., the children in the virtual AP Group 1020). The information, here the single nibble in each of the signal source identifiers 1025-1027, that is unique to each signal source identifier in a virtual group may be designated as distinct identifying information. The signal source identifiers 1026, 1027 have distinct identifying information 1040, and the signal source identifier 1025 has distinct identifying information 1042. The distinct identifying information 1040 in the reduced data set 1060 may include an indication 1044 of which signal source identifier is the corresponding parent signal source identifier, and an indication 1046 of which nibble position(s) the distinct identifying information replaces in the parent signal source identifier. Furthermore, the signal source data set reducing unit 560 may transmit an average RSSI value for the virtual AP Group 1020, which may be used for each of the signal source identifiers in the group 1020, since the values of virtual AP Group 1020 correspond to the same radio transmitter.

The virtual AP Group 1030 includes two reference signal source identifiers 1002, along with their corresponding respective signal strengths 1004. The members of the group 1030 differ by only one nibble, and differ only slightly in their respective RSSI values, indicating that the signals corresponding to the virtual AP group 1030 likely come from the same physical radio transmitter. Accordingly, the signal source data set reducing unit 560 may determine and transmit the reduced signal source data set 1060 shown including the full signal source identifier of only the parent signal source identifier of the virtual AP group 1030, of which most bits are common identifying information for the virtual AP group 1030, and only distinct identifying information 1050 for the one child of the virtual AP group 1030.

Performing virtual AP collapsing, the signal source data set reducing unit 560 may produce the reduced signal source data set by compressing at least one of the reference signal source identifiers to reduce the unique data identifying a child signal source identifier compared to an uncompressed data set. The uncompressed signal source data set may include a first reference signal source identifier, for a parent, and a second reference signal source identifier, for a child, the first and second reference signal source identifiers each having common identifying information. Each of the first and second reference signal source identifiers also have distinct identifying information, such as the distinct and identifying information 1050 of virtual AP Group 1030. The reduced signal source data set that is reduced by a compression may include the common identifying information and the distinct identifying information for each group parent, and only respective distinct identifying information for each child in each group. For example, for the virtual group 1030, the reduced data set 1060 may include common information (741ec 16d318) and distinct information (1) for the parent signal source identifier 1025, and less than all (e.g., none) of the common identifying information and the distinct identifying information (6) for the child signal source identifier 1026.

In addition to or instead of compressing reference signal source identifiers, a reduced signal source data set may be determined by down-selection where fewer than all available reference signal source identifiers may be selected for transmission by the signal source data set reducing unit 560. One means of limiting transmission payload size for signal measurements is to select, randomly, a subset of available measurements. However, arbitrarily reducing the number of measurements in this way may result in poor yield (meaning no location estimate can be calculated at all or at least with a threshold level of accuracy). A better method of down-selection may be to down-select while at least attempting to ensure geographic diversity.

Referring to FIG. 11, a method 1100 of down-selecting signal measurements preserves geographic diversity in a data set (possibly maximum geographic diversity). Available measurements to be sent to the network entity 600 (e.g., a cloud service) may be down-selected by the signal source data set reducing unit 560 in a particular way to try to preserve geographic diversity of signal sources, based on diversity of signal strengths, e.g., in a way that maximizes signal strength (e.g., RSSI) diversity of selected ones of the available measurements. To maximize signal strength diversity, the signal source data set reducing unit 560 may select the available measurements with the strongest and weakest signal strengths (with signal strengths below a configurable threshold possibly being ignored). Additional measurements may be added in stepwise fashion until a desired number (M) of measurements is reached. At each down-selection step, that measurement whose RSSI (or other indication of signal strength) value is most remote from the RSSI values of the already-chosen measurements may be selected. Selecting measurements in this manner may help ensure a diverse subset of the available measurements and in turn good horizontal dilution of precision (HDOP).

Down-selection can be further optionally enhanced using knowledge about WIFI® access points (APs) that may be undesirable for use in positioning. For example, some APs may be associated with mobile devices or infrastructure installed on mobile devices (e.g., trains, buses, airplanes, etc.) such that use of measurements of signals from such APs may result in poor positioning accuracy. The signal source data set reducing unit 560 may filter out (e.g., ignore) signal sources for possible selection in a down-selection process, e.g., based on SSID (Service Set Identifier) and/or OUI (Organizationally Unique Identifier). For example, the signal source data set reducing unit 560 may have SSIDs and/or OUIs to be filtered out hard-coded in the memory 530 or stored in the memory 530 due to being pushed (e.g., periodically) to the UE 500, e.g., from the network entity 600. As another example, the signal source data set reducing unit 560 may be configured to filter out locally-administered signal sources (e.g., signal sources with signal source identifiers (e.g., MAC addresses) that are not globally unique).

The method 1100 is an example of the method 700 and includes producing a second signal source data set 1108 via a down-selection of available reference signal source identifiers from a first signal source data set 1106. The down-selection may be executed in a manner such that maximum geographic diversity present in the signal source data set 1106 (ignoring measurement values below a threshold) may be preserved within the second signal source data set 1108 produced therefrom. In this example, the second signal source data set 1108 is reduced in data size compared with the first signal source data set 1106. For this reason, the second signal source data set 1108 may be referred to herein as a "reduced signal source data set." The down-selection in this example is executed based on a signal strength diversity of the corresponding signal strengths in 1104 in the first signal source data set 1106. More particularly in this example, the down-selection preserves, within the second signal source data set 1108, a maximum signal strength diversity found in the first signal source data set 1106.

In particular in FIG. 11, the signal source data set 1106 obtained by the UE 500 (e.g., the signal source data set obtaining unit 550) includes multiple reference signal source identifiers 1102, in this case MAC addresses, and corresponding signal strengths 1104, in this case in the form of RSSI values. The signal source data set 1106 comprises N available identifiers, in this example with N=11 available identifiers. The reduced signal source data set 1108, illustrated on the right of FIG. 11, obtained via a down-selection, has exactly M reduced-set reference signal source identifiers (with M=5 in the illustrated case). The values of N and M are integers, with M being less than N such that the data set 1108 has less data (e.g., fewer bits) than the data set 1106.

The signal source data set reducing unit 560 may be configured to down-select the signal source data set 1106 to produce the reduced signal source data set 1108 with measurement diversity, and thus presumably geographic diversity of signal sources. The signal source data set reducing unit 560 may be configured to select a measurement with a strongest signal strength (−7 dB in this example) as the first, M=1, selection, with a corresponding signal source identifier. The signal source data set reducing unit 560 may be configured to select a measurement with a weakest signal strength (−98 dB in this example) as the second, M=2, selection, with a corresponding signal source identifier. If a third, M=3, selection is to be made, then the signal source data set reducing unit 560 may select the signal strength measurement of the available signal strengths 1104, and corresponding signal source identifier, with a signal strength that differs most from the combination of the M=1 and M=2 signal strengths, in this case a signal strength of −57 dB. The signal source data set reducing unit 560 may be configured to select measurements other than the strongest signal, the weakest signal, and the signal with the most different strength from the strongest and weakest signals. Selecting the strongest signal, the weakest signal, and the signal with the most different strength from the strongest and weakest signals, however, provides maximum signal strength diversity and presumably helps provide maximum signal source geographic diversity, which helps with positioning accuracy.

For selections beyond three measurements, the signal source data set reducing unit 560 may be configured to select a measurement that is most different from previously-selected measurements. For example, the signal source data set reducing unit 560 may be configured to select a fourth measurement, M=4, corresponding to a signal strength of the available signal strengths that is between, and differs most from, the M=3 signal strength and either the M=1 signal strength or the M=2 signal strength. In the case of FIG. 11, the M=4 signal strength (−33 dB) is between, and differs most from, the M=3 signal strength and the M=1 signal strength. Further in this example, the signal source data set reducing unit 560 may be configured to select a fifth measurement, M=5, corresponding to an M=5 signal strength of the remaining available signal strengths that is between, and differs most from, the M=3 and M=2 signal strengths. In this manner, both maximum signal strength diversity, and likely, maximum geographic diversity represented by the group of N available reference signal source identifiers, is preserved in the down-selected, reduced signal source data set 1108. Selecting measurements with measurement diversity may help ensure that a location estimate can be obtained (e.g., at all or with at least a desired accuracy) using the down-selected, transmitted, reduced signal source data set 1108. As described above, optionally, the down-selecting can further include filtering out one or more of the available identifiers that each corresponds to a mobile access point, as these measurements will have less value in determining location of the UE 500.

FIG. 12 is a schematic diagram illustrating a method 1200 that is a specific example of the method 700 and that includes compressing a first signal source data set 1210, reduced using a lossy compression, to produce a second signal source data set 1220. The signal source data set 1210 (an uncompressed data set) includes signal source identifiers 1212 and signal strength indications 1214 (and/or other signal measurement indication(s)). The second signal source data set 1220, which is produced via the lossy compression, includes an entirety of at least one of the signal source identifiers 1212 of the data set 1210, here a signal source identifier 1216 which may be designated as a parent identifier (with a corresponding parent signal source, e.g., parent AP). The parent signal source may be the signal source corresponding to a highest measured signal strength. Signal source identifiers 1212 corresponding to signal sources other than the parent signal source in the data set 1210 are compressed by the signal source data set reducing unit 560 via the lossy compression, in this case a hash function. While the parent signal source identifier 1216 is preserved in its entirety in the second signal source data set 1220, the children signal source identifiers (all of the signal source identifiers 1212 other than the parent signal source identifier 1216) are hashed by the reducing unit 560 using the hash function, resulting in the corresponding, second signal source data set 1220 that is illustrated in FIG. 12. In this case, the second signal source data set 1220 is reduced in that the data set 1220 has less data (e.g., fewer bits) than the data set 1210, in this example by having some signal source identifiers 1222 in the data set 1220 represented by less data than corresponding signal source identifiers 1212 in the data set 1210.

The compressed, second signal source data set 1220 is transmitted by the UE 500, e.g., the reducing unit 560, to the network entity 600 as described herein in connection with FIG. 6, for example. The network entity 600, e.g., the signal source data set processing unit 650, may be configured to reconstruct the signal source identifiers 1212 from the signal source identifiers 1222, a mapping of compressed signal source identifiers to signal sources and corresponding locations, and a location of the parent signal source. Furthermore, the procedure 900, illustrated in FIG. 9, for processing a signal source data set, may be understood more fully in reference to the right side of FIG. 12, which represents actions taken by the network entity 600.

The network entity 600 receives the second signal source data set 1220, which is reduced in data size, via compression, compared to the data set 1210. The second signal source data set 1220 includes at least one (as in the illustrated case of FIG. 12) compressed signal source identifier that is compressed via a compression (here, a hash function) applied to a full signal source identifier at the UE 500 and transmitted by the UE 500 to the network entity 600.

The network entity 600, e.g., the signal source data set processing unit 650, may identify a location of the parent signal source based on the signal source identifier 1216. For example, the processing unit 650 may retrieve a look-up table 1240, from the memory 630, that maps compressed signal source identifiers 1250 to signal source locations 1260 and to complete signal source identifiers 1270. The look-up table 1240 may include signal source identifiers 1250 from the data set 1220 and/or compressed signal source identifiers 1250 for a signal source cluster. The signal source cluster may comprise signal sources within a perimeter 1280. The full signal source identifier of the parent signal source is provided in the data set 1220 such that the location of the parent signal source may be determined. The network entity 600 seeks to match each compressed signal source identifier of the signal source identifiers 1222 with one of the compressed signal source identifiers 1250 available to the network entity 600 to determine corresponding locations of the signal sources corresponding to the compressed signal sources of the signal source identifiers 1222. In this example, the look-up table 1240 includes compressed signal source identifiers 1250, corresponding signal source locations 1260, and corresponding full signal source identifiers 1270 for seven signal sources 1231, 1232, 1233, 1234, 1235, 1236, 1237 corresponding to seven locations (LocX where X=1, 2, . . . 7).

For each of the compressed identifiers of the signal source identifiers 1222, the network entity 600 may identify one of the compressed signal source identifiers 1250 that matches the compressed transmitted signal source identifier. If there are multiple signal source identifiers 1250 that match a single one of the signal source identifiers 1222, e.g., signal source identifiers 1251, 1252 that match the compressed signal source identifier for the signal source identifier 1218, then the processing unit 650 may attempt to narrow the matching signal source identifiers 1250 to a single signal source identifier based on the signal source locations 1260 and the perimeter 1280. The processing unit 650 may, for example, select the signal source identifier 1250 (of the multiple identifiers 1250) with a corresponding location 1260 that is within the perimeter 1280 (e.g., ignore any of the signal source locations 1260 outside of the perimeter 1280). In this example, the compressed signal source identifier ("12fa") corresponding to the signal source identifier 1218 corresponds to multiple signal sources 1233, 1237 with corresponding locations ("Loc3" and "Loc7"), only one of which (the signal source 1237 at location Loc7) is within the perimeter 1280. The compressed signal source identifier "12fa" in this example would be matched by the processing unit 650 to the location Loc7 and the corresponding uncompressed signal source identifier. If there are still multiple possible signal source identifiers 1250 after comparing signal source locations to the perimeter 1280, then then processing unit 650 may select the signal source identifier 1250 with a corresponding location 1260 closest to the location 1260 of the parent signal source (here "Loc1"). Alternatively, if there are still multiple possible signal source identifiers 1250, then then processing unit 650 may not use any of the measurements corresponding to the multiple possible signal source identifiers. The network entity 600 may recover the full signal source identifier 1270 corresponding to the matched, compressed child signal source identifiers of the identifiers 1250 of the second signal source data set 1220.

Two or more techniques discussed with respect to FIGS. 10-12 may be combined. For example, signal source identifiers may be compressed (using one or more of the compression techniques discussed) and then down selected. As another example, signal source identifiers may be down selected and then compressed (using one or more of the compression techniques discussed).

FIG. 13 is an example signal and processing flow 1300 for determining and providing UE location data. The flow 1300 is an example flow and not limiting. The flow 1300 may be altered, e.g., by having one or more messages and/or one or more stages added, removed, rearranged, combined, performed concurrently, and/or having one or more messages and/or one or more stages split into multiple messages and/or stages. Example stages, together with data flow, are shown as time progresses along the downward direction along the time axis shown.

The external client 130 may send a location inquiry 1308 to the network entity 600 seeking to receive an updated location of the UE 500. The network entity 600 may send a location data request 1309 to the UE 500. The location data request 1309 may cause the UE 500 to try to receive, decode, and measure positioning signals. The location inquiry 1308 and the location data request 1309 may trigger an aperiodic or semi-persistent reporting of measurement data by the UE 500. Also, or alternatively, the UE 500 may periodically measure positioning signals and/or report measurement data without being triggered by the network entity 600 (i.e., the location inquiry 1308 and the location data request 1309 may be omitted).

At stage 1310, the UE 500 may receive reference signals 1312, 1314, 1316. The stage 1310 may be an example of the stage 710. The flow 1330 shows the three reference signal sources 1302, 1304, and 1306 as an example only. More generally, embodiments may operate with any number two or more reference signal sources to form a plurality thereof, and with any corresponding number of two or more reference signal source identifiers as applicable to constitute a plurality of reference signals and a corresponding plurality of reference signal source identifiers.

At stage 1320, the UE 500 (e.g., the signal source data set obtaining unit 550) may obtain a signal source data set such as the signal source data set 1006.

At stage 1330, the UE 500 (e.g., the signal source data set reducing unit 560) may produce a reduced signal source data set, either by compression or down-selection, e.g., as described in connection with FIG. 7 and FIGS. 10-12. Stage 1330 may be an example of stage 730.

At stage 1340, the UE 500 may transmit a reduced signal source data set 1342 to the network entity 600, and this reduced signal source data set 1342 may be received (e.g., as an example of stage 810 or stage 910) by the network entity 600. The reduced signal source data set 1342 may be a data set reduced via compression, examples of which are provided in FIG. 10 and FIG. 12. The reduced signal source data set 1342 may be reduced via down selection as discussed with respect to FIG. 11. By way of example only, the transmission of the reduced signal source data set 1342 may be via NRPPa, LPP, NPP. RRC, or another protocol.

At stage 1350, the network entity 600 may identify signal source locations. For example, the processing unit 650 may recover full signal source identifiers from the data set 1060 by combining the common identifying information and the distinct identifying information for each signal source identifier. As another example, the processing unit 650 may read full signal source identifiers from the data set 1108. The processing unit 650 may determine signal source locations corresponding to full signal source identifiers, e.g., from a look-up table in the memory 630. As another example, the processing unit 650 may determine signal source locations per the method 1200.

At stage 1360, the network entity 600 may determine position information (also called location data). For example, the processor 610 may use the identified locations of the signal sources, in conjunction with corresponding positioning signal measurements (e.g., signal strengths) in order to determine a location estimate of the UE 500 according to one or more known methods.

At stage 1370, the network entity 600 may report an estimated location 1372 of the UE 500 to the external client 130. For example, the processor 610 may transmit the estimated location 1372 via a wireless transmitter and an antenna and/or via a wired transmitter. The estimated location 1372 may include values of a latitude and a longitude of the UE 500.

The processing flow 1300 shows identification of RS source locations (at stage 1350) and determination (at stage 1360) of a location of the UE 500 occurring at the network entity 600. However, many alternative flows may be used and are within the scope of this description and the claims. For example, the network entity 600 may perform an optional transmission of a reduced signal source data set 1374 to the external client 130. In this case, the external client 130 may identify RS source locations and/or determine location of the UE, and the network entity 600 need not perform stages 1350, 1360, 1370. The optional transmission of the reduced signal source data set 1374 may include other information from the network as needed for the external client 130 to determine the location of the UE 500 based on the reduced signal source data set. In another example, the network entity 600 may perform an optional transmission of RS source locations 1376. In this case, the external client 130 may determine location of the UE 500, and the network entity 600 may not perform stages 1360, 1370. In another example, the network entity 600 may perform an optional transmission of RS source locations 1378 to the UE 500. In this case, the UE 500 may determine a location of the UE 500, and the network entity 600 may not perform stages 1360, 1370.

The discussion of the processing flow 1300 has focused on network-based positioning of the UE 500, but the techniques discussed may also or alternatively be applied to one or more other uses, such as crowd-sourcing of signal source locations and UE-based positioning. For example, at stage 1380, a UE 501 (which may be configured similarly to the UE 500) may, similar to stages 1310, 1320, 1330, 1340, receive reference signals, obtain a data set, produce a reduced data set, and transmit the reduced data set to the network entity 600. The UE 501 may measure positioning signals, such as the reference signals 1312, 1314, 1316 from the signal sources 1302, 1304, 1306, and report measurements of the reference signals 1312, 1314, 1316 in a measurement report 1382 to the network entity 600. For example, the UE 501 may use measurements to obtain a data set (similar to stage 1320), e.g., the signal source data set 1006, and produce (e.g., similar to stage 1330) a reduced data set (e.g., through lossy compression, lossless compression, or selective reduction, or an appropriate combination thereof), and report (e.g., similar to stage 1340) the reduced data set in the measurement report 1382. The UE 501 may measure reference signals and/or report reference signal measurements without being requested and/or in response to being requested (e.g., by a location data request 1307 received from the network entity 600). The measurement report 1382 may include a location (e.g., latitude and longitude) of the UE 501. There may be multiple UEs that, like the UE 501, report measurements of the reference signals 1312, 1314, 1316 such that the network entity 600 may crowd source locations of the reference signal sources 1302, 1304, 1306 based on the reported reference signal measurements and corresponding UE locations. Also or alternatively, at stage 1390, a UE 502 (which may be configured similarly to the UE 500) may receive assistance data (AD) 1392 from the network entity 600. The AD 1392 may include information for the UE 502 to use to measure the reference signals 1302, 1304, 1306 and to use to determine a location estimate of the UE 502. For example, the AD 1392 may include locations of the reference signal sources 1302, 1304, 1306, and these locations may be based on crowd-sourced positioning signal measurements, e.g., from one or more of the measurement reports 1382. At stage 1390, the UE 502 may use the AD 1392 to measure (M) positioning signals, such as the reference signals 1312, 1314, 1316 from the signal sources 1302, 1304, 1306, determine (D) a position estimate for the UE 502, and possibly report (R) the determined position estimate to the network entity 600 in a report 1394.

Implementation Examples

Implementation examples are provided in the following numbered clauses.

Clause 1. A method of providing UE location data, the method comprising:
receiving, at the UE, a plurality of reference signals, each of the plurality of reference signals being from a respective one of a plurality of reference signal sources, and each of the plurality of reference signals being associated with a corresponding signal strength;
obtaining, based on the plurality of reference signals, a first signal source data set comprising reference signal source identifiers and corresponding signal strengths for respective ones of the plurality of reference signals;
producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and
transmitting, from the UE, the second signal source data set.

Clause 2. The method of clause 1, wherein producing the second signal source data set comprises compressing at least one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier.

Clause 3. The method of clause 2, wherein the second signal source data set comprises only one indication of the common identifying information for the first reference signal source identifier and the second reference signal source identifier combined.

Clause 4. The method of clause 2, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

Clause 5. The method of clause 1, wherein producing the second signal source data set comprises a lossy compression of one or more of the reference signal source identifiers, and wherein the second signal source data set includes a unique identifier for at least one of the reference signal source identifiers.

Clause 6. The method of clause 1, wherein producing the second signal source data set comprises down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
an M=1 second-set reference signal source identifier corresponding to an M=1 signal strength that is a strongest signal strength of second-set signal strengths corresponding to the M second-set reference signal source identifiers;
an M=2 second-set reference signal source identifier corresponding to an M=2 signal strength that is a weakest signal strength of the second-set signal strengths;
an M=3 second-set reference signal source identifier corresponding to an M=3 signal strength of the second-set signal strengths that is between, and differs most from, the M=1 and M=2 signal strengths; and
an M=4 second-set reference signal source identifier corresponding to an M=4 signal strength of the second-set signal strengths that is between, and differs most from, the M=3 signal strength and either the M=1 signal strength or the M=2 signal strength.

Clause 7. The method of clause 6, wherein the down-selecting includes filtering out one or more of the available identifiers that each corresponds to a mobile access point.

Clause 8. The method of clause 1, wherein producing the second signal source data set is with a smaller data size than the first signal source data set, or wherein down-selecting available identifiers based on the signal strength diversity includes preserving, in the second signal source data set, a maximum signal strength diversity of corresponding signal strengths of the first signal source data set.

Clause 9. A UE comprising:
one or more transceivers;
one or more memories; and
one or more processors, communicatively coupled to the one or more transceivers and the one or more memories, the one or more processors configured to:
receive, via the one or more transceivers, a plurality of reference signals, each of the plurality of reference signals being from a respective one of a plurality of reference signal sources, and each of the plurality of reference signals being associated with a corresponding signal strength;
obtain, based on the plurality of reference signals, a first signal source data set comprising reference signal source identifiers and corresponding signal strengths for respective ones of the plurality of reference signals;

produce a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and transmit, via the one or more transceivers, the second signal source data set.

Clause 10. The UE of clause 9, wherein the one or more processors are configured to produce the second signal source data set by compressing at least one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier.

Clause 11. The UE of clause 10, wherein the second signal source data set comprises only one indication of the common identifying information for the first reference signal source identifier and the second reference signal source identifier combined.

Clause 12. The UE of clause 10, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

Clause 13. The UE of clause 9, wherein the one or more processors are configured to produce the second signal source data set by a lossy compression of one or more of the reference signal source identifiers, and wherein the second signal source data set includes a unique identifier of at least one of the reference signal source identifiers.

Clause 14. The UE of clause 9, wherein the one or more processors are configured to produce the second signal source data set by down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:

an $M=1$ second-set reference signal source identifier corresponding to an $M=1$ signal strength that is a strongest signal strength of second-set signal strengths corresponding to the M second-set reference signal source identifiers;

an $M=2$ second-set reference signal source identifier corresponding to an $M=2$ signal strength that is a weakest signal strength of the second-set signal strengths;

an $M=3$ second-set reference signal source identifier corresponding to an $M=3$ signal strength of the second-set signal strengths that is between, and differs most from, the $M=1$ and $M=2$ signal strengths; and an $M=4$ second-set reference signal source identifier corresponding to an $M=4$ signal strength of the second-set signal strengths that is between, and differs most from, the $M=3$ signal strength and either the $M=1$ signal strength or the $M=2$ signal strength.

Clause 15. The UE of clause 14, wherein the down-selecting includes filtering out one or more of the available identifiers that each corresponds to a mobile access point.

Clause 16. The UE of clause 9, wherein the one or more processors are further configured to produce the second signal source data set with a smaller data size than the first signal source data set, or wherein the one or more processors are further configured to preserve, in the second signal source data set, a maximum signal strength diversity of corresponding signal strengths of the first signal source data set.

Clause 17. A UE comprising:

means for receiving, at the UE, a plurality of reference signals, each of the plurality of reference signals being from a respective one of a plurality of reference signal sources, and each of the plurality of reference signals being associated with a corresponding signal strength;

means for obtaining, based on the plurality of reference signals, a first signal source data set comprising reference signal source identifiers and corresponding signal strengths for respective ones of the plurality of reference signals;

means for producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and means for transmitting, from the UE, the second signal source data set.

Clause 18. The UE of clause 17, wherein the means for producing the second signal source data set includes means for compressing at least one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier.

Clause 19. The UE of clause 18, wherein the second signal source data set comprises only one indication of the common identifying information for the first reference signal source identifier and the second reference signal source identifier combined.

Clause 20. The UE of clause 18, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

Clause 21. The UE of clause 17, wherein the means for producing the second signal source data set includes means for compressing using a lossy compression of one or more of the reference signal source identifiers, and wherein the second signal source data set includes a unique identifier of at least one of the reference signal source identifiers.

Clause 22. The UE of clause 17, wherein the means for producing the second signal source data set includes means for down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
- an M=1 second-set reference signal source identifier corresponding to an M=1 signal strength that is a strongest signal strength of second-set signal strengths corresponding to the M second-set reference signal source identifiers;
- an M=2 second-set reference signal source identifier corresponding to an M=2 signal strength that is a weakest signal strength of the second-set signal strengths;
- an M=3 second-set reference signal source identifier corresponding to an M=3 signal strength of the second-set signal strengths that is between, and differs most from, the M=1 and M=2 signal strengths; and
- an M=4 second-set reference signal source identifier corresponding to an M=4 signal strength of the second-set signal strengths that is between, and differs most from, the M=3 signal strength and either the M=1 signal strength or the M=2 signal strength.

Clause 23. The UE of clause 22, wherein the means for down-selecting includes means for filtering out one or more of the available identifiers that each corresponds to a mobile access point.

Clause 24. The UE of clause 17, wherein the means for producing the second signal source data set includes means for producing the second signal source data set with a smaller data size than the first signal source data set, or wherein the means for producing the second signal source data set further includes means for preserving, in the second signal source data set, a maximum signal strength diversity of the corresponding signal strengths of the first signal source data set.

Clause 25. A non-transitory, processor-readable storage medium comprising processor-readable instructions to cause one or more processors, of a UE, to:
- receive, at the UE, a plurality of reference signals, each of the plurality of reference signals being from a respective one of a plurality of reference signal sources, and each of the plurality of reference signals being associated with a corresponding signal strength;
- obtain, based on the plurality of reference signals, a first signal source data set comprising reference signal source identifiers and corresponding signal strengths for respective ones of the plurality of reference signals;
- produce a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers; and
- transmit, from the UE, the second signal source data set.

Clause 26. The non-transitory, processor-readable storage medium of clause 25, wherein the processor-readable instructions configured to cause the one or more processors to produce the second signal source data set comprise processor-readable instructions configured to cause the one or more processors to compress at least one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier.

Clause 27. The non-transitory, processor-readable storage medium of clause 26, wherein the second signal source data set comprises only one indication of the common identifying information for the first reference signal source identifier and the second reference signal source identifier combined.

Clause 28. The non-transitory, processor-readable storage medium of clause 26, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

Clause 29. The non-transitory, processor-readable storage medium of clause 25, wherein the processor-readable instructions are configured to cause the one or more processors to produce the second signal source data set by compressing using a lossy compression of one or more of the reference signal source identifiers, and wherein the second signal source data set includes a unique identifier of at least one of the reference signal source identifiers.

Clause 30. The non-transitory, processor-readable storage medium of clause 25, wherein the processor-readable instructions are configured to cause the one or more processors to produce the second signal source data set by down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
- an M=1 second-set reference signal source identifier corresponding to an M=1 signal strength that is a strongest signal strength of second-set signal strengths corresponding to the M second-set reference signal source identifiers;
- an M=2 second-set reference signal source identifier corresponding to an M=2 signal strength that is a weakest signal strength of the second-set signal strengths;
- an M=3 second-set reference signal source identifier corresponding to an M=3 signal strength of the second-set signal strengths that is between, and differs most from, the M=1 and M=2 signal strengths; and
- an M=4 second-set reference signal source identifier corresponding to an M=4 signal strength of the second-set signal strengths that is between, and differs most from, the M=3 signal strength and either the M=1 signal strength or the M=2 signal strength.

Clause 31. The non-transitory, processor-readable storage medium of clause 30, wherein the down-selecting includes filtering out one or more of the available identifiers that each corresponds to a mobile access point.

Clause 32. The non-transitory, processor-readable storage medium of clause 25, wherein the processor-readable instructions configured to cause the one or more processors to produce the second signal source data set comprise processor-readable instructions configured to cause the one or more processors to produce the second signal source data set with a smaller data size than the first signal source data set, or wherein the processor-readable instructions are further configured to cause the one or more processors to preserve, in the second signal source data set, a maximum signal strength diversity of the corresponding signal strengths of the first signal source data set.

Clause 33. A method of processing a signal source data set, the method comprising:
receiving, at a network entity, the signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication;
identifying, at the network entity, a first location of a first reference signal source based on the common identifying information and the first distinct identifying information;
identifying, at the network entity, a second location of a second reference signal source based on the common identifying information and the second distinct identifying information; and
determining, at the network entity, a range between a UE and the second reference signal source based on the signal strength indication, the first location of the first reference signal source, and the second location of the second reference signal source.

Clause 34. A network entity comprising:
one or more transceivers;
one or more memories; and
one or more processors, communicatively coupled to the one or more transceivers and the one or more memories, the one or more processors configured to:
receive, via the one or more transceivers, a signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication;
identify a first location of a first reference signal source based on the common identifying information and the first distinct identifying information;
identify a second location of a second reference signal source based on the common identifying information and the second distinct identifying information; and
determine a range between the UE and the second reference signal source based on the signal strength indication, the first location of the first reference signal source, and the second location of the second reference signal source.

Clause 35. A network entity comprising:
means for receiving, at the network entity, a signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication;
means for identifying, at the network entity, a first location of a first reference signal source based on the common identifying information and the first distinct identifying information;
means for identifying, at the network entity, a second location of a second reference signal source based on the common identifying information and the second distinct identifying information; and
means for determining a range between a UE and the second reference signal source based on the signal strength indication, the first location of the first reference signal source, and the second location of the second reference signal source.

Clause 36. A non-transitory, processor-readable storage medium comprising processor-readable instructions to cause one or more processors, of a network entity, to:
receive, at the network entity, a signal source data set comprising common identifying information corresponding to a first reference signal source identifier and a second reference signal source identifier, the signal source data set further comprising first distinct identifying information corresponding to the first reference signal source identifier and second distinct identifying information different from the first distinct identifying information and corresponding to the second reference signal source identifier, wherein the common identifying information is associated with a signal strength indication;
identify a first location of a first reference signal source based on the common identifying information and the first distinct identifying information;
identify a second location of a second reference signal source based on the common identifying information and the second distinct identifying information; and
determine a range between a UE and the second reference signal source based on the signal strength indication, the first location of the first reference signal source, and the second location of the second reference signal source.

Clause 37. A method of processing a signal source data set, the method comprising:
receiving, at one or more network entities, the signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier;
identifying a first location of the first signal source based on the first signal source identifier;
identifying a second location of a second signal source based on the second signal source identifier and the first location of the first signal source; and
determining a range between a user equipment (UE) and the second signal source based on the second signal strength indication, the first location of the first signal source, and the second location of the second signal source.

Clause 38. The method of clause 37, wherein identifying the second location of the second signal source comprises determining that the second location is within a threshold perimeter of the first location of the first signal source.

Clause 39. The method of clause 38, wherein identifying the second location of the second signal source comprises ignoring a third signal source having a corresponding third signal source identifier that matches the second signal source identifier and that has a corresponding third location that is outside the threshold perimeter of the first location of the first signal source.

Clause 40. A network entity comprising:
one or more transceivers;
one or more memories; and
one or more processors, communicatively coupled to the one or more transceivers and the one or more memories, the one or more processors configured to:
  receive, via the one or more transceivers, a signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier;
  identify a first location of the first signal source based on the first signal source identifier;
  identify a second location of a second signal source based on the second signal source identifier and the first location of the first signal source; and
  determine a range between a user equipment (UE) and the second signal source based on the second signal strength indication, the first location of the first signal source, and the second location of the second signal source.

Clause 41. The network entity of clause 40, wherein the one or more processors are further configured to determine that the second location is within a threshold perimeter of the first location of the first signal source.

Clause 42. The network entity of clause 41, wherein the one or more processors are further configured to ignore a third signal source having a corresponding third signal source identifier that matches the second signal source identifier and that has a corresponding third location that is outside the threshold perimeter of the first location of the first signal source.

Clause 43. A network entity comprising:
means for receiving, at the network entity, a signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier;
means for identifying a first location of the first signal source based on the first signal source identifier;
means for identifying a second location of a second signal source based on the second signal source identifier and the first location of the first signal source; and
means for determining a range between a user equipment (UE) and the second signal source based on the second signal strength indication, the first location of the first signal source, and the second location of the second signal source.

Clause 44. The network entity of clause 43, wherein means for identifying the second location of the second signal source comprises means for determining that the second location is within a threshold perimeter of the first location of the first signal source.

Clause 45. The network entity of clause 44, wherein the means for identifying the second location of the second signal source comprises means for ignoring a third signal source having a corresponding third signal source identifier that matches the second signal source identifier and that has a corresponding third location that is outside the threshold perimeter of the first location of the first signal source.

Clause 46. A non-transitory, processor-readable storage medium comprising processor-readable instructions to cause one or more processors, of a network entity, to:
  receive, at the network entity, a signal source data set comprising a first signal source identifier corresponding to a first signal source, a first indication of a first signal strength corresponding to the first signal source identifier, a second signal source identifier that has less data than the first signal source identifier, and a second indication of a second signal strength corresponding to the second signal source identifier;
  identify a first location of the first signal source based on the first signal source identifier;
  identify a second location of a second signal source based on the second signal source identifier and the first location of the first signal source; and
  determine a range between a user equipment (UE) and the second signal source based on the second signal strength indication, the first location of the first signal source, and the second location of the second signal source.

Clause 47. The non-transitory, processor-readable storage medium of clause 46, wherein the processor-readable instructions are further configured to determining that the second location is within a threshold perimeter of the first location of the first signal source.

Clause 48. The non-transitory, processor-readable storage medium of clause 47, wherein the processor-readable instructions are further configured to ignore a third signal source having a corresponding third signal source identifier that matches the second signal source identifier and that has a corresponding third location that is outside the threshold perimeter of the first location of the first signal source.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Even if referred to in the singular, including in the claims, a device (e.g., a processor, a memory, transceiver, network entity, etc.) may include one or more of such devices (e.g., one or more processors, one or more memories, one or more transceivers, one or more network entities, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method of providing UE location data, the method comprising:
    receiving, at the UE, a plurality of reference signals, each of the plurality of reference signals being from a respective one of a plurality of reference signal sources, and each of the plurality of reference signals being associated with a corresponding signal strength;
    obtaining, based on the plurality of reference signals, a first signal source data set comprising reference signal source identifiers and corresponding signal strengths for respective ones of the plurality of reference signals;
    producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier; and
    transmitting, from the UE, the second signal source data set.

2. The method of claim 1, wherein the second signal source data set comprises only one indication of the common identifying information for the first reference signal source identifier and the second reference signal source identifier combined.

3. The method of claim 1, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

4. The method of claim 1, wherein producing the second signal source data set comprises a lossy compression of one or more of the reference signal source identifiers, and wherein the second signal source data set includes a unique identifier for at least one of the reference signal source identifiers.

5. The method of claim 1, wherein producing the second signal source data set comprises down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
    a) an M=1 second-set reference signal source identifier corresponding to an M=1 signal strength that is a strongest signal strength of second-set signal strengths corresponding to the M second-set reference signal source identifiers;
    b) an M=2 second-set reference signal source identifier corresponding to an M=2 signal strength that is a weakest signal strength of the second-set signal strengths;
    c) an M=3 second-set reference signal source identifier corresponding to an M=3 signal strength of the second-set signal strengths that is between, and differs most from, the M=1 and M=2 signal strengths; and
    d) an M=4 second-set reference signal source identifier corresponding to an M=4 signal strength of the second-set signal strengths that is between, and differs most from, the M=3 signal strength and either the M=1 signal strength or the M=2 signal strength.

6. The method of claim 5, wherein the down-selecting includes filtering out one or more of the available identifiers that each corresponds to a mobile access point.

7. The method of claim 1, wherein producing the second signal source data set comprises producing the second signal source data set with a smaller data size than the first signal source data set, or wherein down-selecting available identifiers based on the signal strength diversity includes preserving, in the second signal source data set, a maximum signal strength diversity of corresponding signal strengths of the first signal source data set.

8. A UE comprising:
    one or more transceivers;
    one or more memories; and
    one or more processors, communicatively coupled to the one or more transceivers and the one or more memories, the one or more processors configured to:
        receive, via the one or more transceivers, a plurality of reference signals, each of the plurality of reference signals being from a respective one of a plurality of reference signal sources, and each of the plurality of reference signals being associated with a corresponding signal strength;
        obtain, based on the plurality of reference signals, a first signal source data set comprising reference signal source identifiers and corresponding signal strengths for respective ones of the plurality of reference signals;
        produce a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier; and transmit, via the one or more transceivers, the second signal source data set.

9. The UE of claim 8, wherein the second signal source data set comprises only one indication of the common identifying information for the first reference signal source identifier and the second reference signal source identifier combined.

10. The UE of claim 8, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

11. The UE of claim 8, wherein the one or more processors are configured to produce the second signal source data set by a lossy compression of one or more of the reference signal source identifiers, and wherein the second signal source data set includes a unique identifier of at least one of the reference signal source identifiers.

12. The UE of claim 8, wherein the one or more processors are configured to produce the second signal source data set by down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
 a) an M=1 second-set reference signal source identifier corresponding to an M=1 signal strength that is a strongest signal strength of second-set signal strengths corresponding to the M second-set reference signal source identifiers;
 b) an M=2 second-set reference signal source identifier corresponding to an M=2 signal strength that is a weakest signal strength of the second-set signal strengths;
 c) an M=3 second-set reference signal source identifier corresponding to an M=3 signal strength of the second-set signal strengths that is between, and differs most from, the M=1 and M=2 signal strengths; and
 d) an M=4 second-set reference signal source identifier corresponding to an M-4 signal strength of the second-set signal strengths that is between, and differs most from, the M=3 signal strength and either the M=1 signal strength or the M=2 signal strength.

13. The UE of claim 12, wherein the down-selecting includes filtering out one or more of the available identifiers that each corresponds to a mobile access point.

14. The UE of claim 8, wherein the one or more processors are further configured to produce the second signal source data set with a smaller data size than the first signal source data set, or wherein the one or more processors are further configured to preserve, in the second signal source data set, a maximum signal strength diversity of corresponding signal strengths of the first signal source data set.

15. A UE comprising:
 means for receiving, at the UE, a plurality of reference signals, each of the plurality of reference signals being from a respective one of a plurality of reference signal sources, and each of the plurality of reference signals being associated with a corresponding signal strength;
 means for obtaining, based on the plurality of reference signals, a first signal source data set comprising reference signal source identifiers and corresponding signal strengths for respective ones of the plurality of reference signals;
 means for producing a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier; and
 means for transmitting, from the UE, the second signal source data set.

16. The UE of claim 15, wherein the second signal source data set comprises only one indication of the common identifying information for the first reference signal source identifier and the second reference signal source identifier combined.

17. The UE of claim 15, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

18. The UE of claim 15, wherein the means for producing the second signal source data set includes means for compressing using a lossy compression of one or more of the reference signal source identifiers, and wherein the second signal source data set includes a unique identifier of at least one of the reference signal source identifiers.

19. The UE of claim 15, wherein the means for producing the second signal source data set includes means for down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
 a) an M=1 second-set reference signal source identifier corresponding to an M=1 signal strength that is a strongest signal strength of second-set signal strengths corresponding to the M second-set reference signal source identifiers;

b) an M=2 second-set reference signal source identifier corresponding to an M=2 signal strength that is a weakest signal strength of the second-set signal strengths;
c) an M=3 second-set reference signal source identifier corresponding to an M=3 signal strength of the second-set signal strengths that is between, and differs most from, the M=1 and M=2 signal strengths; and
d) an M=4 second-set reference signal source identifier corresponding to an M=4 signal strength of the second-set signal strengths that is between, and differs most from, the M=3 signal strength and either the M=1 signal strength or the M=2 signal strength.

20. The UE of claim 19, wherein the means for down-selecting includes means for filtering out one or more of the available identifiers that each corresponds to a mobile access point.

21. The UE of claim 15, wherein the means for producing the second signal source data set include means for producing the second signal source data set with a smaller data size than the first signal source data set, or wherein the means for producing the second signal source data set further includes means for preserving, in the second signal source data set, a maximum signal strength diversity of the corresponding signal strengths of the first signal source data set.

22. A non-transitory, processor-readable storage medium comprising processor-readable instructions to cause one or more processors, of a UE, to:
receive, at the UE, a plurality of reference signals, each of the plurality of reference signals being from a respective one of a plurality of reference signal sources, and each of the plurality of reference signals being associated with a corresponding signal strength;
obtain, based on the plurality of reference signals, a first signal source data set comprising reference signal source identifiers and corresponding signal strengths for respective ones of the plurality of reference signals;
produce a second signal source data set by at least one of compressing at least one of the reference signal source identifiers, or down-selecting available identifiers based on a signal strength diversity of the corresponding signal strengths of the first signal source data set, each of the available identifiers comprising one of the reference signal source identifiers or a compressed one of the reference signal source identifiers, wherein the first signal source data set includes a first reference signal source identifier and a second reference signal source identifier each with common identifying information and each with respective distinct identifying information, and wherein the second signal source data set comprises the common identifying information and the respective distinct identifying information for the first reference signal source identifier and less than all, if any, of the common identifying information for the second reference signal source identifier; and
transmit, from the UE, the second signal source data set.

23. The non-transitory, processor-readable storage medium of claim 22, wherein the second signal source data set comprises only one indication of the common identifying information for the first reference signal source identifier and the second reference signal source identifier combined.

24. The non-transitory, processor-readable storage medium of claim 22, wherein the first reference signal source identifier and the second reference signal source identifier are part of a plurality of the reference signal source identifiers that include the common identifying information, and wherein the second signal source data set includes an average signal strength associated with the plurality of the reference signal source identifiers.

25. The non-transitory, processor-readable storage medium of claim 22, wherein the processor-readable instructions are configured to cause the one or more processors to produce the second signal source data set by compressing using a lossy compression of one or more of the reference signal source identifiers, and wherein the second signal source data set includes a unique identifier of at least one of the reference signal source identifiers.

26. The non-transitory, processor-readable storage medium of claim 22, wherein the processor-readable instructions are configured to cause the one or more processors to produce the second signal source data set by down-selecting the available identifiers, wherein the available identifiers consist of N available identifiers, wherein the second signal source data set comprises exactly M second-set reference signal source identifiers, wherein N and M are integers and M<N, and wherein the M second-set reference signal source identifiers include:
a) an M=1 second-set reference signal source identifier corresponding to an M=1 signal strength that is a strongest signal strength of second-set signal strengths corresponding to the M second-set reference signal source identifiers;
b) an M=2 second-set reference signal source identifier corresponding to an M=2 signal strength that is a weakest signal strength of the second-set signal strengths;
c) an M=3 second-set reference signal source identifier corresponding to an M=3 signal strength of the second-set signal strengths that is between, and differs most from, the M=1 and M=2 signal strengths; and
d) an M=4 second-set reference signal source identifier corresponding to an M=4 signal strength of the second-set signal strengths that is between, and differs most from, the M=3 signal strength and either the M=1 signal strength or the M=2 signal strength.

* * * * *